(12) United States Patent
Mizoguchi et al.

(10) Patent No.: US 6,243,858 B1
(45) Date of Patent: *Jun. 5, 2001

(54) PROGRAM CONSTRUCTION ASSISTING SYSTEM

(75) Inventors: Takehiko Mizoguchi, Hamura; Masaharu Meki, Tachikawa, both of (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,212

(22) Filed: Jul. 21, 1998

(30) Foreign Application Priority Data

Jul. 24, 1997 (JP) .................................................... 9-198865
Aug. 29, 1997 (JP) .................................................... 9-234540
Sep. 9, 1997 (JP) .................................................... 9-244127

(51) Int. Cl.[7] .............................................................. G06F 9/45
(52) U.S. Cl. ................................................... 717/1; 717/11
(58) Field of Search .......................................... 717/1, 11

(56) References Cited

U.S. PATENT DOCUMENTS

| | | | | |
|---|---|---|---|---|
| 5,381,548 | * | 1/1995 | Matsuo | 395/700 |
| 5,603,018 | * | 2/1997 | Terada et al. | 395/561 |
| 5,687,331 | * | 11/1997 | Volk et al. | 395/327 |
| 5,884,306 | * | 3/1999 | Bliss et al. | 707/7 |
| 5,946,691 | * | 8/1999 | Lee et al. | 707/100 |
| 6,026,336 | * | 2/2000 | Sakurai et al. | 700/86 |

\* cited by examiner

Primary Examiner—Mark R. Powell
Assistant Examiner—Wei Zhen
(74) Attorney, Agent, or Firm—Frishauf, Holtz, Goodman, Langer & Chick, P.C.

(57) ABSTRACT

In a business application program construction system, various basic processing modules constituting a business application program have been prepared beforehand. When an application program is actually constructed, module tiles representing the individual modules are displayed in the form of a module palette. At the same time, a grid panel on which the module tiles are arranged is displayed. The user arranges the module tiles necessary for the business application program on the grid panel by a drag and drop operation using the module palette. Combinations of the module tiles make it easy to construct the components for the business application program.

10 Claims, 25 Drawing Sheets

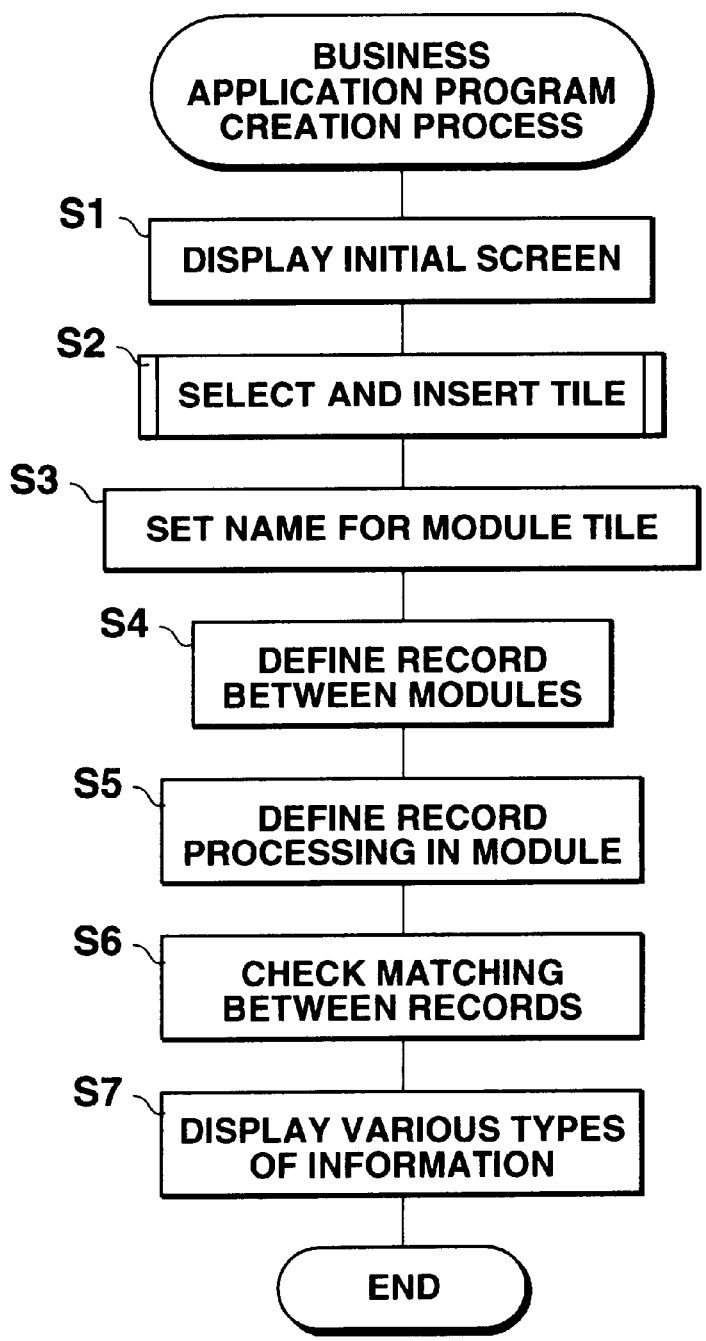

FIG.6A  INITIAL STATE
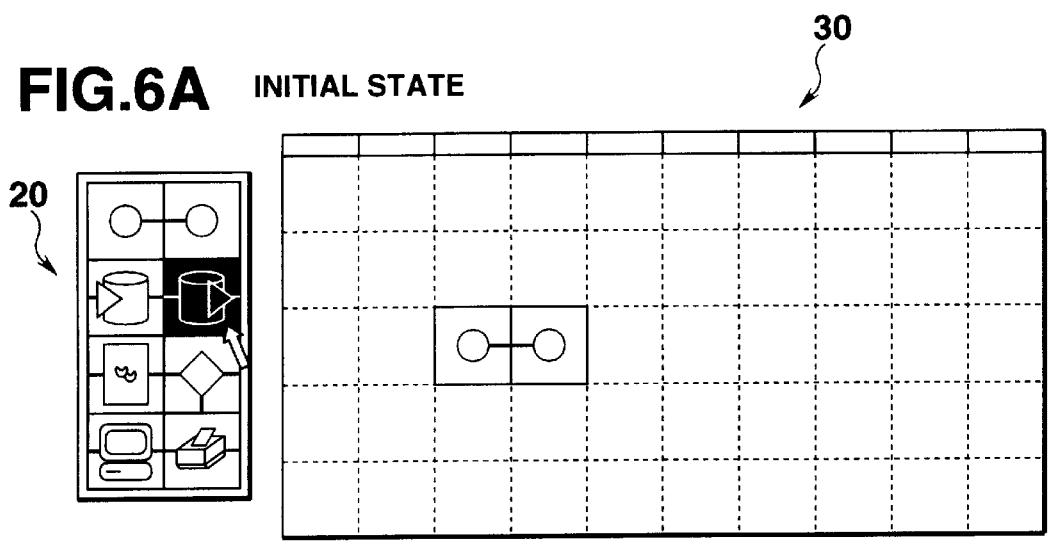
FIG.6B  CHOOSING AND ARRANGING TARGET
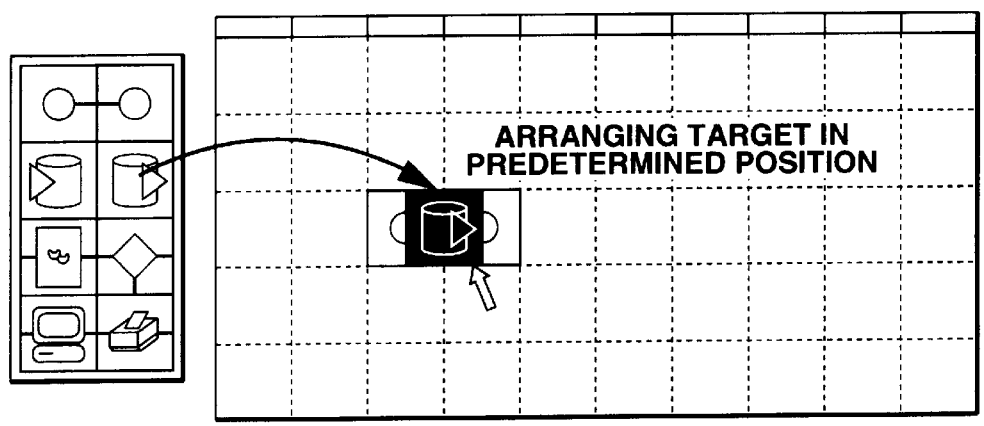
FIG.6C  COMPLETING ARRANGIMENT
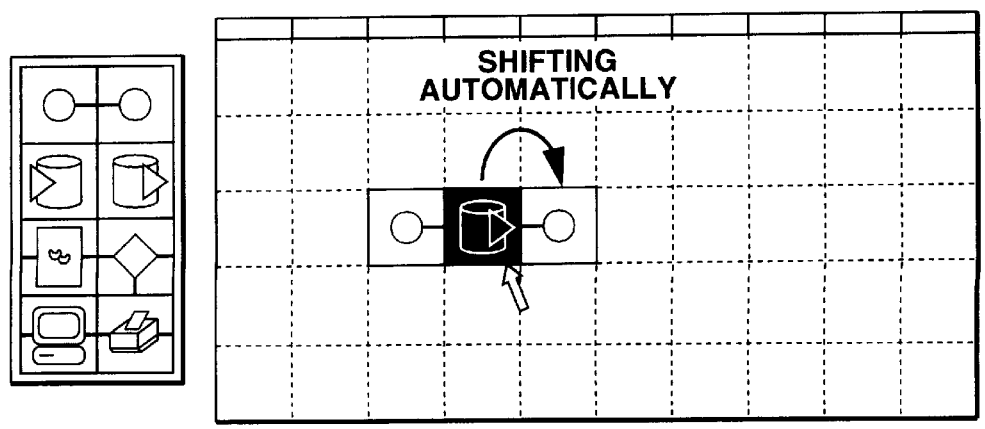

40: PROPERTY SHEET

CHOOSE ADJACENT MODULES

DEFINITION OF DATA RECORD

| DEFINITION OF DATA RECORD | |
|---|---|
| NAME | INPUT DATA 1 |

| ITEM | TYPE |
|---|---|
| RECORD ITEM 1 | CHARACTER |
| RECORD ITEM 2 | CHARACTER |
| RECORD ITEM 3 | CHARACTER |
| RECORD ITEM 4 | CHARACTER |
| RECORD ITEM 5 | CHARACTER |
| RECORD ITEM 6 | CHARACTER |
| RECORD ITEM 7 | CHARACTER |
| RECORD ITEM 8 | CHARACTER |
| RECORD ITEM 9 | CHARACTER |

AGREE    CANCEL

MODULE TILE INFORMATION DISPLAY

CONDITIONAL MODULE INFORMATION DISPLAY

FIG.14A ARRANGING CONDITIONAL BRANCH MODULE
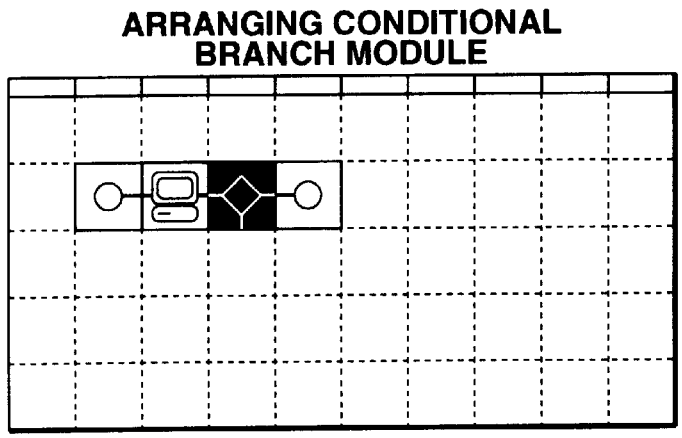
FIG.14B SETTING CONDITIONAL PROPERTY
FIG.14C CREATING BRANCH LINES AUTOMATICALLY
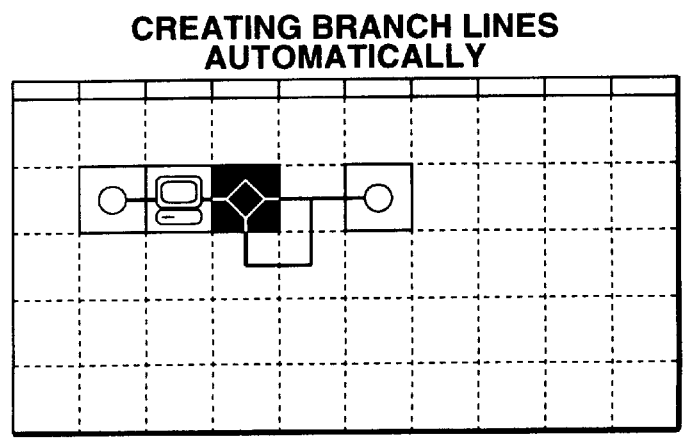

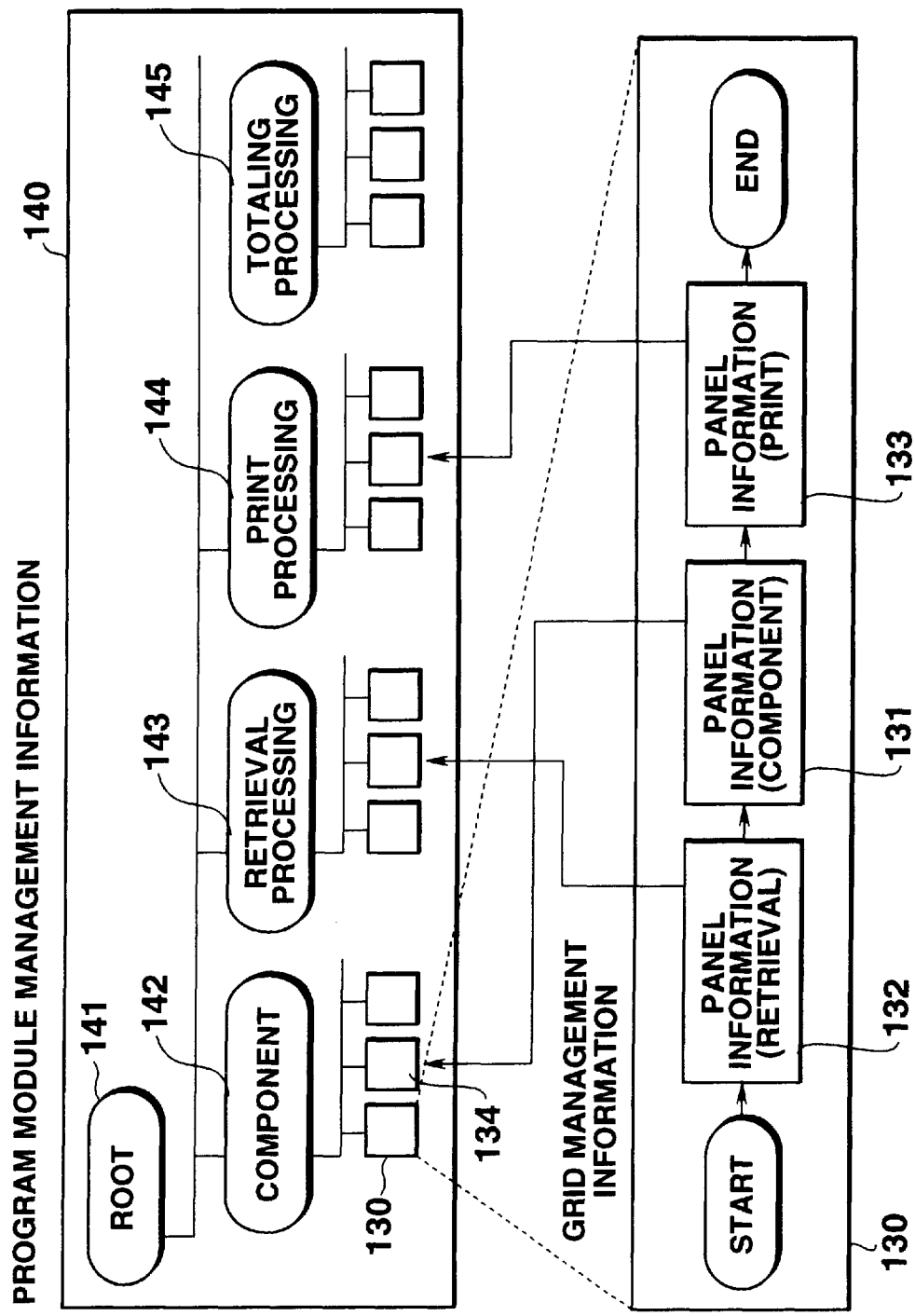

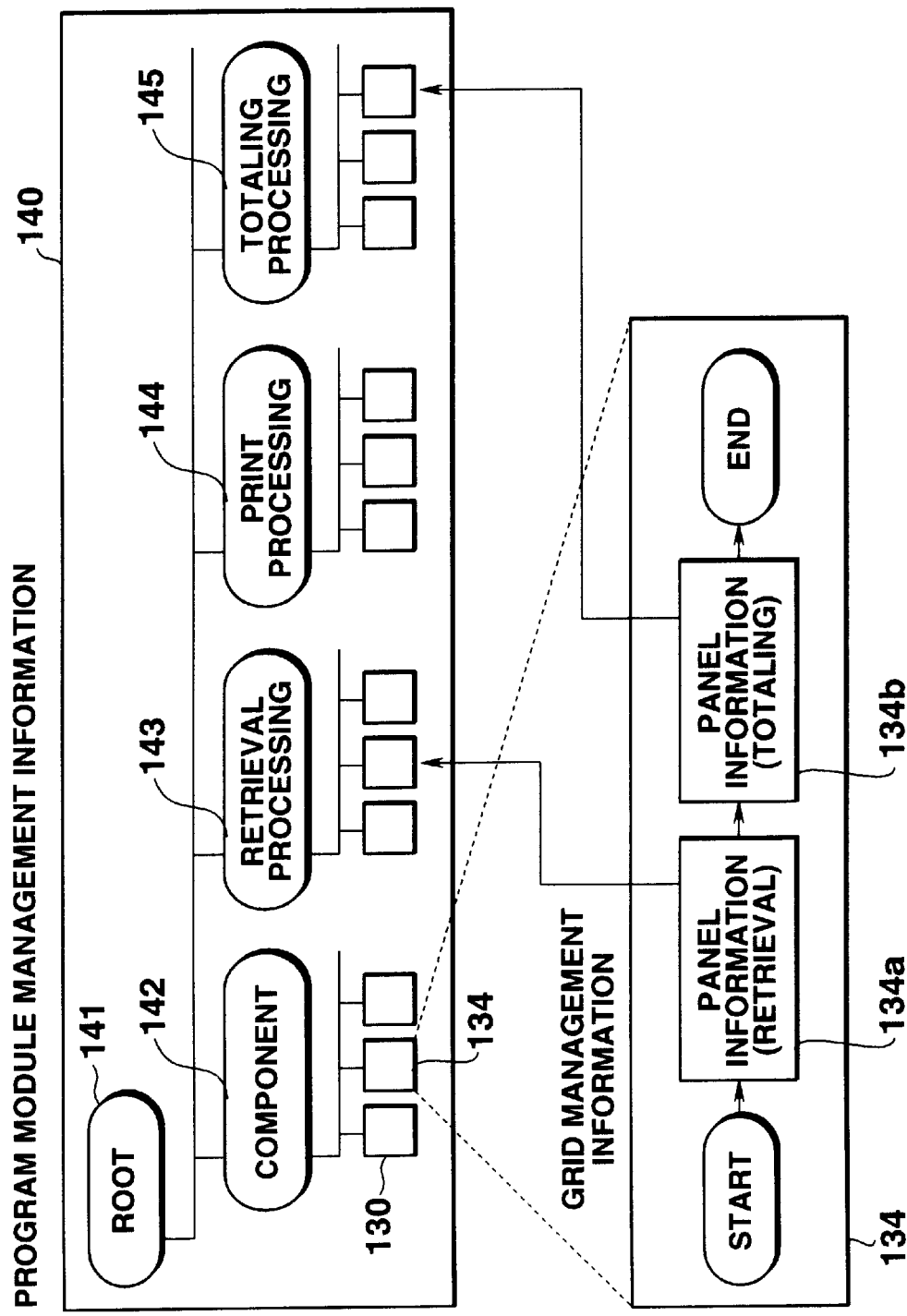

CONSTRUCTING APPLICATION PROGRAM

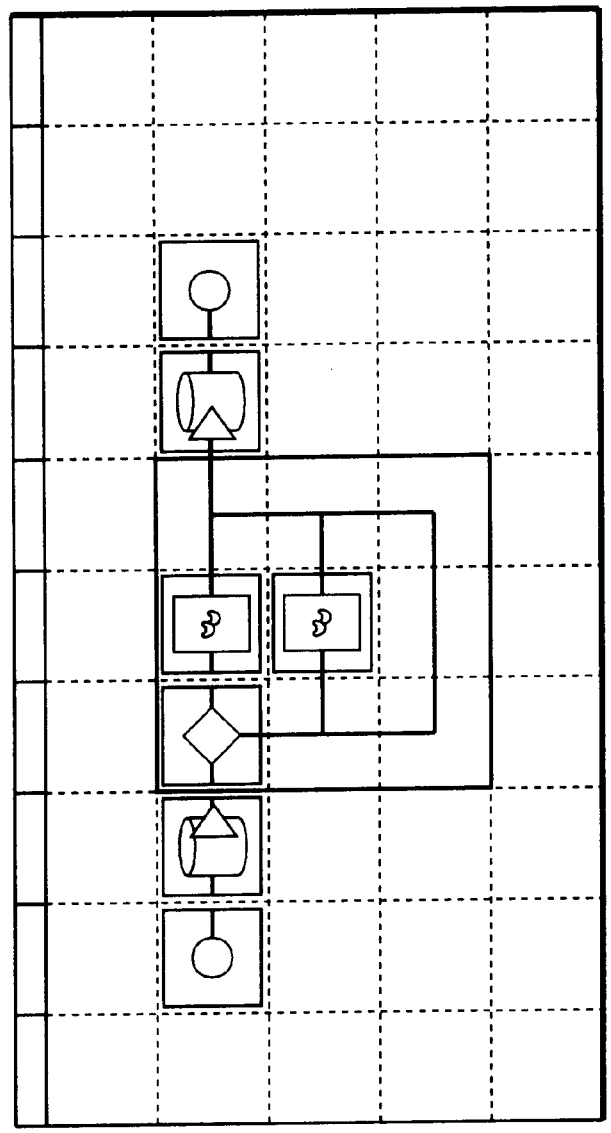
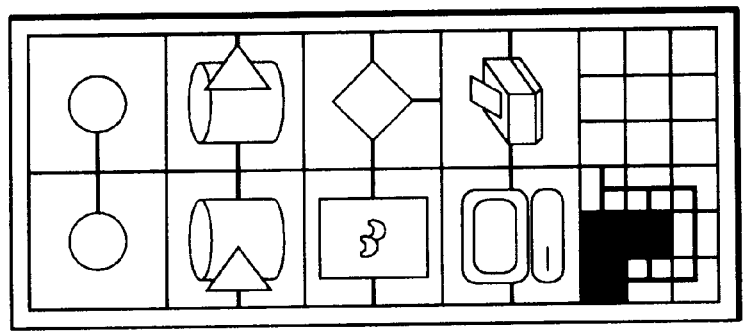
FIG.21

FIG.22A

MODULE TILE DISPLAY DATA

| TILE ARRANGEMENT | COORDINATES | COLOR |
|---|---|---|
|  |  |  |
|  |  |  |
|  |  |  |

FIG.22B

PROCESSING TIME IN EACH PROGRAM MODULE

| PROGRAM MODULE NO.1 | TIME t1 |
|---|---|
| ........ | .... |
| PROGRAM MODULE NO.n | tn |

EXECUTION OF STEPS →

PROGRAM CONSTRUCTION ASSISTING SYSTEM

BACKGROUND OF THE INVENTION

The present invention relates to a program construction assisting system for assisting in constructing business application programs.

Many business application programs used in business computers have been composed of such basic processes as the input, processing, and output of data records. For example, a billing process is composed of the following processes:

Inputting slip data from an input/display unit such as a keyboard or a CRT

Processing data records on memory

Updating data records into data files

Printing data records on an output unit such as a printer

Furthermore, for example, a master maintenance process is composed of the following processes:

Inputting retrieval conditions from an input/display unit

Retrieving the data record from a data file

Displaying data records on a display unit

Correcting the relevant data record

Processing data records on memory

Updating data records into data files

Moreover, for example, a ledger printing process is composed of the following processes:

Inputting retrieval conditions from an input unit

Retrieving the data record from a data file

Processing data records on memory

Printing data records on a printing unit

As described above, the processing of a business application program is basically a series of processes of transferring various types of data records.

What sets those data transfer processes is a business application program construction tool.

In conventional business application program construction tools, however, since the aforementioned processing steps were written in text form, for example, in the C language or the BASIC language, or in table form (various types of database tool), even SEs (system engineers), designers, had the difficulty of grasping the whole picture of the data flow concerning how the data were generated, processed, and outputted.

In recent years, there have been appeared business application program construction tools which visually modularize files or screen data processing and represent the connection between modules by connecting them with lines. Many of such construction tools have represented only the flow of data, making it difficult to accurately grasp the contents of the definition of a data record, an interface between modules, or the contents of data changing with time.

BRIEF SUMMARY OF THE INVENTION

The object of the present invention is to locate, on a specific grid, module tiles obtained by modularizing and visualizing basic processes and set the connection between the module tiles to enable the construction of a business application program, thereby making it possible to grasp the flow of data from the beginning to end of the business application program with the passage of time.

According to the present invention, there is provided a program construction assisting system comprising storage means for storing program modules that perform various types of data processing, module tile storage means for storing module tiles that represent the individual program modules stored in the storage means, arranging means for arranging the module tiles stored in the module tile storage means on a display screen according to a user's instruction, and program construction means for combining program modules stored in the storage means on the basis of arrangement of module tiles by the arranging means to construct a data processing program.

The program construction assisting system further comprises data definition means for defining input and output data in each module tile arranged by the arranging means, and determination means for determining the matching between the individual modules on the basis of the input and output data defined for each of the module tiles.

The program construction assisting system further comprises control means for causing items of the output data defined in a previously arranged module tile to coincide with items of the input data defined in a module tile immediately after the previously arranged module tile, when the input and output data in each module tile arranged by the arranging means is defined.

The program construction assisting system further comprises branching means for displaying a setting screen for setting branch conditions to allow the setting of branch conditions when a module tile indicating a branching process is positioned in arranging the module tiles, display means for displaying connection lines corresponding to the set branch conditions between module tiles positioned in front of and behind the branch processing module tile, and means for reading the program modules from the memory means and combining them on the basis of the branch conditions set for the branch processing module tile to construct a data processing program including a branching process.

The program construction assisting system further comprises selecting means for allowing the user to choose more than one from a group of module tiles arranged by the arranging means, submodule creation means for combining program modules corresponding to the module tiles chosen by the selecting means to create a single submodule, submodule registration means for registering the submodule created by the submodule creation means, submodule storage means for storing module tiles representing the submodules registered in the submodule registration means, and submodule display means for displaying module tiles stored in the submodule storage means on a display screen.

The arranging means includes means for arranging the module tiles displayed by the submodule display means according to instructions on the display screen, and the program construction means includes means for combining program modules stored in the storage means with submodules stored in the submodule storage means on the basis of the state of arrangement of the module tiles arranged by the arranging means to construct a data processing program.

The program construction assisting system further comprises test means for testing the application program constructed by the program construction means, and display control means for providing a special display of module tiles representing the component modules for the program while the program is being tested.

The program construction assisting system further comprises timer means for measuring the time required to perform the processing of the test each time a program module represented by the module tiles is tested, and testing time storage means for storing the testing time measured by the timer means in such a manner that the testing time corresponds to each of the program modules and the display control means changes the representation of each of the module tiles corresponding to each of the program modules, on the basis of the testing time stored in the testing time storage means.

The program construction assisting system further comprises means for moving module tiles in front of and behind the insertion position for rearrangement as a result of inserting a new module tile between module tiles already arranged by the arranging means and displayed on the screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 5 is a flowchart for business application program construction processing according to the present invention;

FIGS. 6A to 6C illustrate screens displayed in the business application program creation process in which FIG. 6A shows an initial screen, FIG. 6B shows a module tile select and layout screen, and FIG. 6C shows a module tile icon layout complete screen;

FIGS. 9A and 9B illustrate screens for defining data records in a billing module tile structure in which FIG. 9A shows a module tile select screen, and FIG. 9B shows a data record definition screen;

FIGS. 14A to 14F illustrate processing in inserting module tile CONDITIONAL BRANCH PROCESSING into the layout in which FIG. 14A shows a state where module tile CONDITIONAL BRANCH PROCESSING is inserted in the layout, FIG. 14B shows a property sheet for setting a conditional equation for module tile CONDITIONAL BRANCH PROCESSING, FIG. 14C shows a state where branch lines are created automatically, FIG. 14D shows a state where the target processing module has been inserted after the creation of branch lines, FIG. 14E shows the result of inserting the target processing module, and FIG. 14F shows a state where all the processes have been inserted;

FIGS. 16A to 16E illustrate screens shown in the subcomponent registration process in which FIG. 16A shows an initial state, FIG. 16B shows a state where a module tile has been selected, FIG. 16C shows the registered subcomponent, FIG. 16D shows a state where the subcomponent has been inserted, and FIG. 16E is a development of the inserted subcomponent;

FIG. 17 shows the structure of data created in the business application program construction processing;

FIG. 18 shows the data structure of a subcomponent created in the business application program construction processing;

FIG. 21 illustrates a screen displayed at the time of the subcomponent insertion process;

FIGS. 22A and 22B pictorially show the structure of data stored in memory during test;

DETAILED DESCRIPTION OF THE INVENTION

Figure 1:
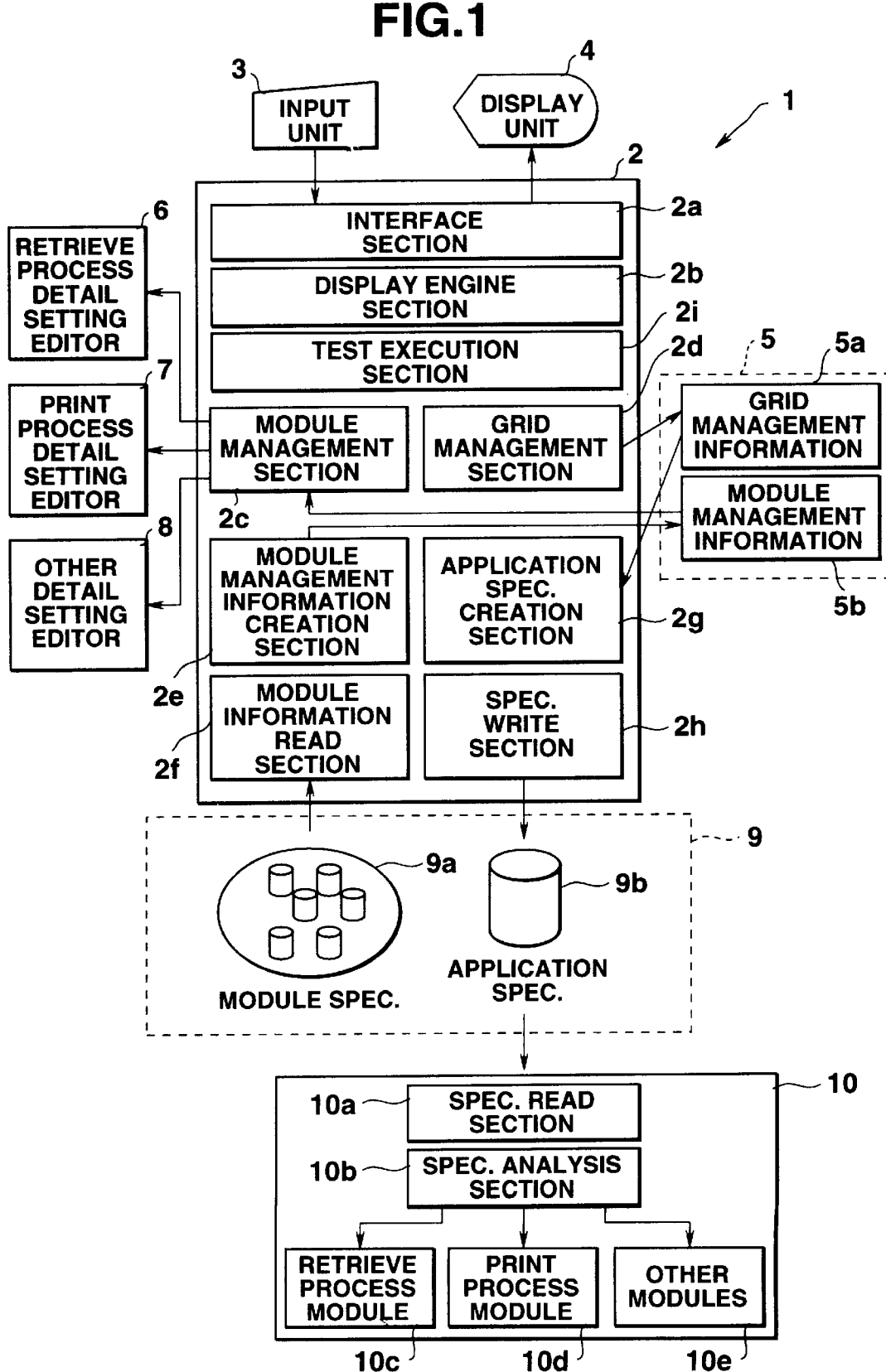
FIG. 1 is a block diagram of the principal sections of a business application program construction system to which the present invention has been applied.

FIG. 1 mainly shows the configuration of software modules in an application program construction system 1. The application program construction system 1 comprises an application program construction section 2, an input unit 3, a display unit 4, a memory unit 5, a retrieval process detail setting editor 6, a print process detail setting editor 7, the other detail setting editor 8, an application program storage section (hard disk) 9, and an application execution section 10.

The application program construction section 2 comprises an interface section 2a, a display engine section 2b, a module management section 2c, a grid management section 2d, a module management information creation section 2e, a module information read section 2f, an application specification creation section 2g, a specification write section 2h, and a test execution section 2i.

The interface section 2a converts various key input signals entered from the input unit 3 or mouse operation signals into signals in specific forms and outputs them as various input data items to the display engine section 2b and, if necessary, to each section in the application program construction section 2. The interface section 2a converts the display data entered from the display engine section 2b into a specific display signal and outputs the display signal to the display unit 4.

The display engine 2b generates display data from the input data entered from the interface section 2a or the processed data entered from each section and outputs the display data to the interface section 2a. The display engine section 2b generates grid display data on the basis of the contents of grid management information entered from the grid management section 2d and outputs the grid display data to the interface section 2a.

The module management section 2c not only manages module management information and makes deletion and correction of the module management information stored in the memory unit 5 but also starts the retrieval process detail setting editor 6 for setting the contents of a module in detail, the print process detail setting editor 7, or the other detail setting editor 8.

The grid management section 2d manages grid management information and executes the movement, deletion, rearrangement of module tiles for the grid management information (information used to manage the concatenation of module tiles in a business application program) stored in the memory unit 5.

The module management information creation section 2e requests the module information read section 2f to read the desired module specification information, converts the module specification information read by the module information read section 2f from a module specification file 9a in the hard disk 9 into module management information (information used to manage the module tile structure for each business application program), and stores the module management information into the memory unit 5.

In response to the module specification information read request from the module management information creation section 2e, the module information read section 2f reads module specification information (detail information on module tiles) from the module specification file 9a in the hard disk 9 and transfers the specification information to the module management information creation section 2e.

The application specification creation section 2g executes not only the process of converting grid management information stored in the memory unit 5 into application specification information but also the process of automatically setting the interface (connection information) between modules.

The specification write section 2h executes the process of writing the application specification information created at the application specification creation section 2g into an application specification file 9b in the hard disk 9.

The test execution section 2i executes the process of testing the application program constructed at the grid management section 2d and application specification creation section 2g.

The memory unit 5 stores grid management information managed by the grid management section 2d into a grid management information file 5a and module management information created by the module management information creation section 2e into a module management information file 5b.

The grid management information is information used to manage the concatenation of module tiles (including start and end module tiles) in a business application program.

The module management information is information used to manage program modules used as module tiles included in the grid management information by type of module used in the business application program (for example, by update process or by print process).

Figure 2:
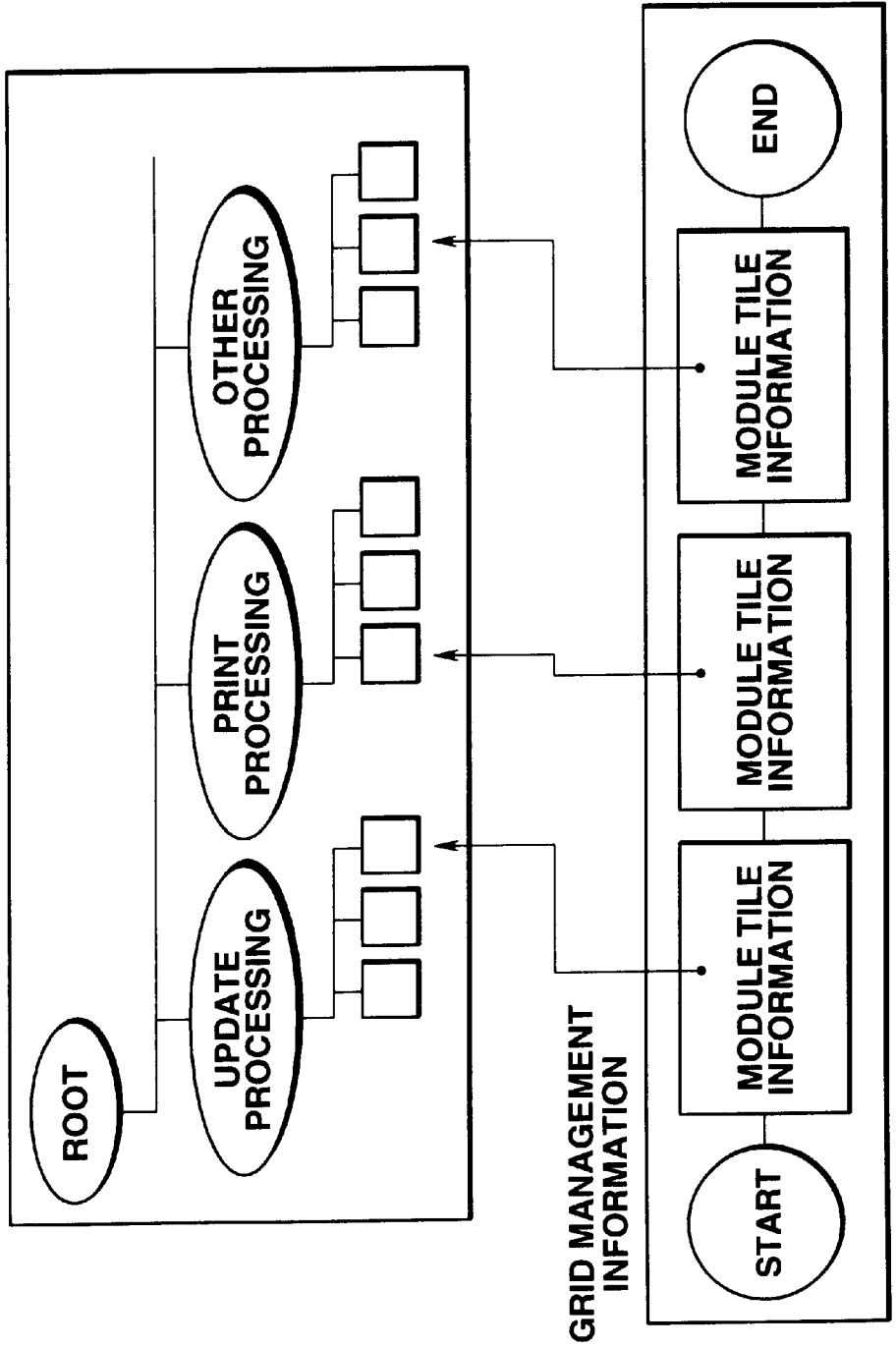
FIG. 2 shows the structure of each of grid management information and module management information stored in the memory unit 5 of FIG. 1.

FIG. 2 shows an example of grid management information and module management information stored in the memory unit 5.

Figure 3:
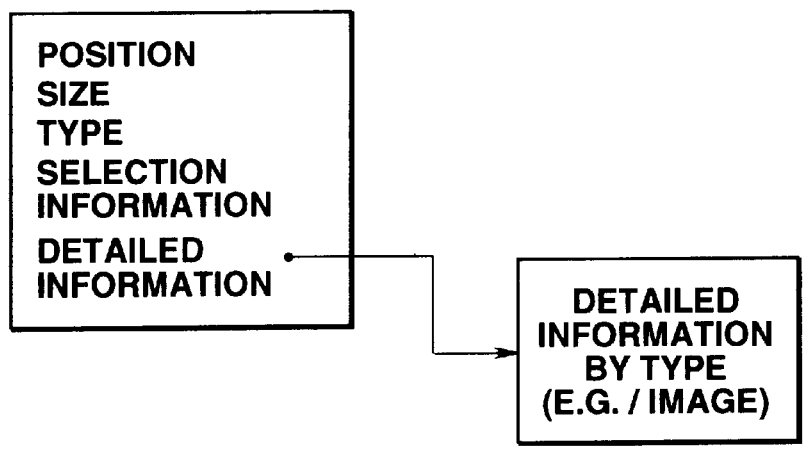
FIG. 3 shows the structure of module tile information linked with grid management information in FIG. 2.

Each piece of module tile information included in the grid management information has the information shown in FIG. 3.

Specifically, the module tile information is composed of POSITION indicating the grid position in which a module tile is arranged, SIZE indicating the size of the module tile, TYPE indicating the type of the module tile, SELECTION INFORMATION indicating that the module tile has been selected, and DETAILED INFORMATION indicating such detail information as image information visually representing the module tile.

The retrieval process detail setting editor 6 is an editor for writing detail retrieval condition setting to cause the application execution section 10 to start a retrieval module.

The print process detail setting editor 7 is an editor for writing detail print condition setting to cause the application execution section 10 to start a print module.

The other detail setting editor 8 is an editor for writing detail processing condition setting to cause the application execution section 10 to start the other modules.

The hard disk 9 stores a module specification file 9a for storing various types of module information previously prepared to construct a business application program and an application specification file 9b for storing the application specification information (information on various types of modules constituting various types of business application programs) constructed by the present system.

The application execution section 10 comprises a specification read section 10a, a specification interpretation section 10b, a retrieval process module 10c, a print process module 10d, and the other modules 10e.

The specification read section 10a reads application specification information stored in the application specification file 9b in the hard disk 9 and transfers it to the specification analysis section 10b. The specification analysis section 10b analyzes the application specification information transferred from the specification read section 10a and instructs the retrieval process module 10c, print process module 10b, or the other modules 10e to execute the necessary process on the basis of the module detail information on the business application program.

According to the retrieval process setting condition set by the retrieval process detail setting editor 6, the retrieval process module 10c executes the retrieval process instructed by the result of analyzing the module detail information on the business application program at the specification analysis section 10.

According to the print process setting condition set by the print process detail setting editor 7, the print process module 10b executes the print process instructed by the result of analyzing the module detail information on the business application program at the specification analysis section 10.

According to the other processes setting condition set by the other detail setting editor 8, the other modules 10c execute the other processes instructed by the result of analyzing the module detail information on the business application program at the specification analysis section 10.

Figure 4:
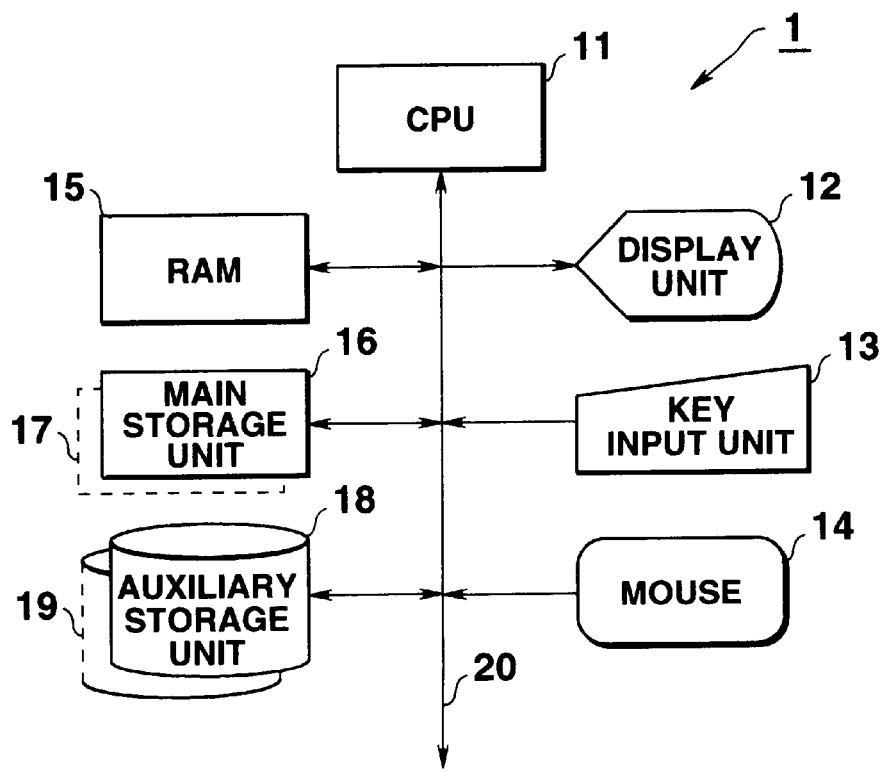
FIG. 4 shows a configuration used to realize the present invention using an ordinary computer.

The system of FIG. 1 can be realized using the configuration of an ordinary computer shown in FIG. 4. In FIG. 4, numeral 11 indicates a CPU, 12 a display unit, 13 a key input unit, 14 a mouse, 15 a RAM, 16 a main storage unit, 17 a main storage medium the main storage unit 16 has, 18 an auxiliary storage unit, 19 an auxiliary storage medium the auxiliary storage unit 18 has, and 20 a bus.

The application program construction system of the present invention is started to operate as follows. The main storage unit 16 is caused to store the individual program modules in the application program construction section 2 and application execution section 10 shown in FIG. 1, and the files in the retrieval process detail setting editor 6, print process detail setting editor 7, the other detail setting editor 8, and the memory unit 5 into the main storage unit 16. Then, the external auxiliary storage unit 18 is caused to store the information in the application program storage section (hard disk) 9. The CPU 11 then executes the above program using the RAM 15 as a work area.

Next, the operation will be explained.

First, the process of creating a business application program executed at the application program construction section 2 in the business application program construction system 1 will be described using the flowchart shown in FIG. 5. Hereinafter, a case where a billing program is created will be explained.

The application program construction section 2 causes the display engine section 2b and interface section 2b to display a module tile palette 20 and a grid panel 30 as shown in FIG. 6A on the display unit 4 as the initial screen (step S1).

The module tile palette 20 displays in panel form the module tiles corresponding to the modules (including the start and end modules) stored in the module specification file 9a in the hard disk 9.

In the module tiles appearing on the module tile palette 20, the tile at the top left indicates PROCESSING START, that at the top right indicates PROCESSING END, that at left in the second row indicates UPDATE PROCESSING, that at right in the second row indicates RETRIEVAL PROCESSING, that at left in the third row indicates DATA MANIPULATION PROCESSING, that at right in the third row indicates CONDITIONAL BRANCH PROCESSING, that at left in the fourth row indicates INPUT PROCESSING, and that at right in the fourth row indicates PRINT PROCESSING.

The grid panel 30 provides a grid for arranging module tiles. On the grid panel 30 of the initial screen 30, the PROCESSING START module tile and the PROCESSING END module tile appear from the beginning. A display area formed by vertical lines and horizontal lines set on the grid panel 30 has the same size as that of a module tile. A module tile can be arranged only in a display area enclosed by the grid lines and cannot be positioned in any other place.

Next, the process of selecting and inserting a module tile is executed according to the click and drag operation of the mouse on the input unit 3 (step S2).

Specifically, the processing modules necessary for data record processing in a business application program are chosen on the module palette 20 and inserted between the START and END module tiles on the grid panel 30.

Figure 7:
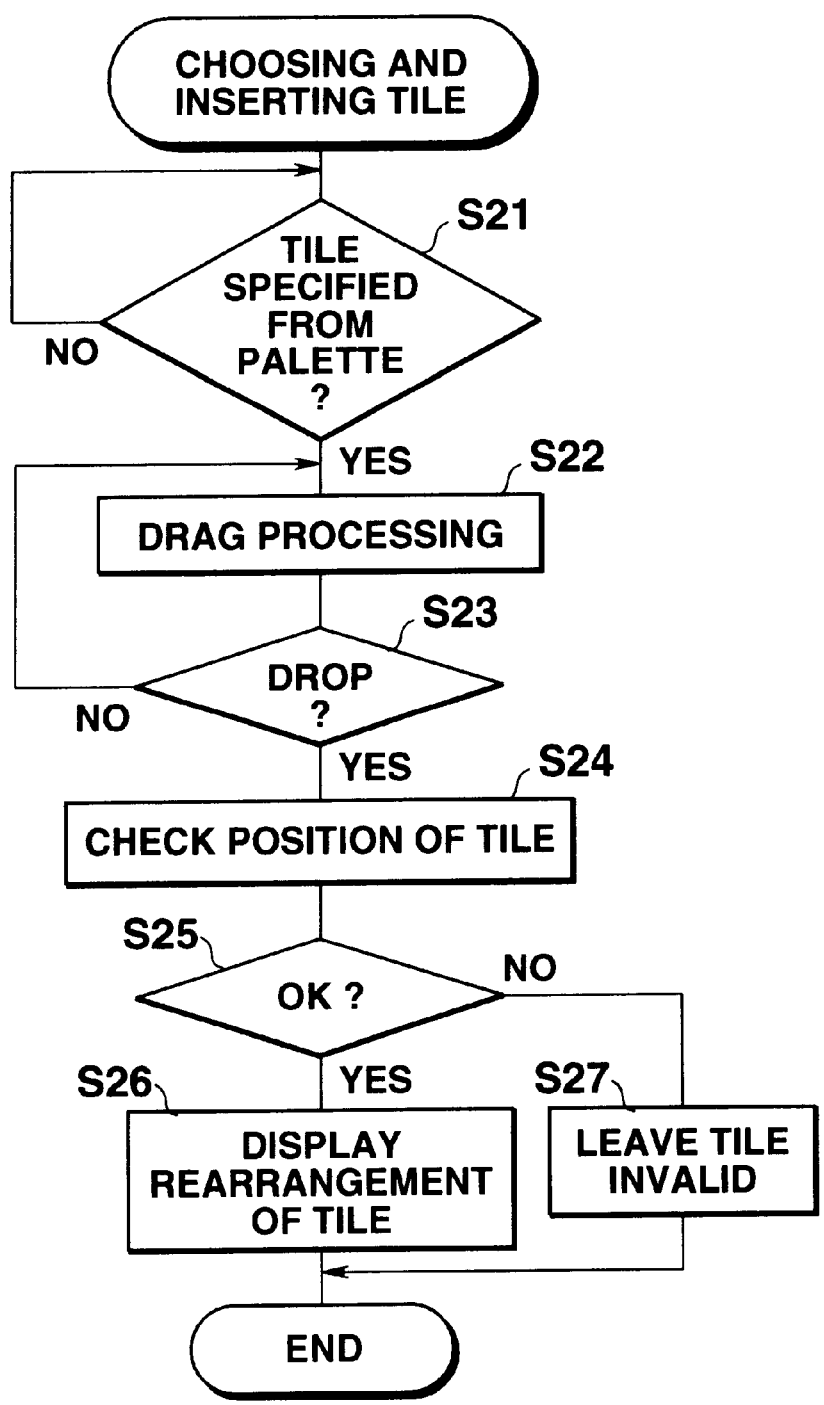
FIG. 7 is a flowchart for module tile select and insert processing executed in the business application program creation process.

The process of choosing and inserting module tiles will be explained in detail by reference to the flowchart of FIG. 7.

First, with the module palette 20, the selection of a module tile is waited for (step S21). One of the module tiles is chosen by a click operation on the mouse. While the tile is being chosen, the drag operation on the mouse causes the module tile to move over the grid panel 30 (step S22). After the drop operation on the mouse (step S23), it is detected in which position the module tile has been arranged on the grid panel 30 (step S24).

Then, it is determined whether the tile has been arranged in an effective place on the grid panel 30 (step S25). Specifically, as shown in FIG. 6B, in arranging the first module tile, when RETRIEVAL FROM FILE module tile has been placed between PROCESSING START module tile and PROCESSING END module tile (the spacing between them is the effective place), OK will be given. When the tile has been placed in the effective place, the location of the PROCESSING END module tile is automatically shifted, rearranged, and displayed (step S26). Then, the process of choosing and inserting the module tile is completed.

When the chosen module tile has not been in the effective place, it is determined to be invalid and left as it is (step S27).

By executing the process of choosing and inserting a module tile repeatedly, the outline of the billing program is formed.

Figure 8:
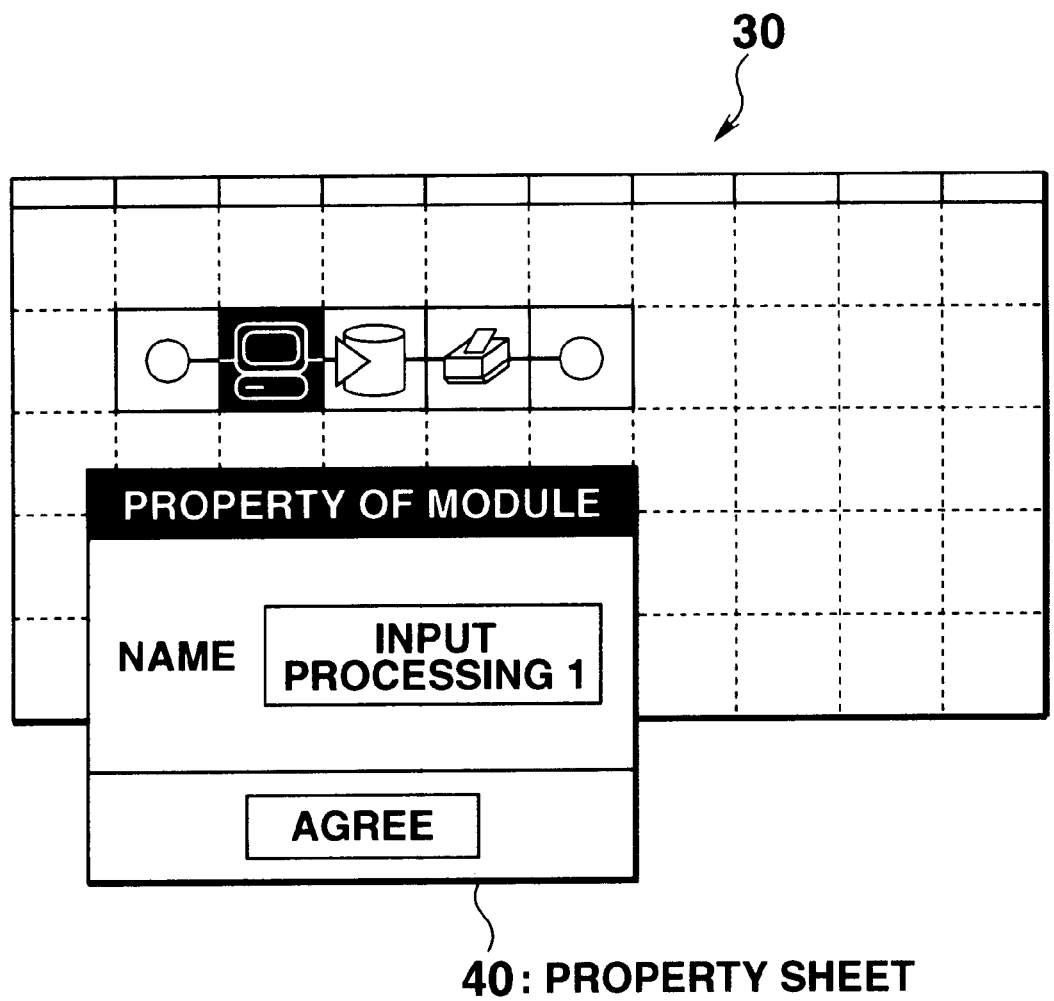
FIG. 8 shows a screen displaying a property sheet for setting names for the module tiles located on the grid panel 30.

After the formation of the outline of the billing program, control returns to the process at step S3 of FIG. 5, where names are set for the individual module tiles arranged on the grid panel 30. For example, when a component (PROCESSING START, INPUT PROCESSING, UPDATE PROCESSING, PRINT PROCESSING, and PROCESSING END) of module tiles as shown in FIG. 8 are formed as an outline, a property sheet 40 for modules is displayed in subwindow form, which enables the user to grasp the entire structure on the grid and set the names. The name setting screen of FIG. 8 shows a case where module tile INPUT PROCESSING on the grid panel 30 has been chosen and "INPUT PROCESSING 1" has been put in the name field on the property sheet 40. In the name setting process, of the module tile icons arranged on the grid panel 30, PROCESSING START module tile and PROCESSING END module tile will not be allocated names.

The module management information creation section 2e stores the name information set for the module into the module management file 5b in the memory unit 5 as module management information in the billing program.

A name may be set for a module tile in advance as a default and the default name be used as it is when the user has not entered another name.

Then, a data record, an input/output interface between module tiles, is defined (step S4).

The definition of the data record means to define its individual modules, the name of the data record itself processed between modules, and the names of the items included in the data record (if necessary, including the data record form).

Figures 9A, 9B:
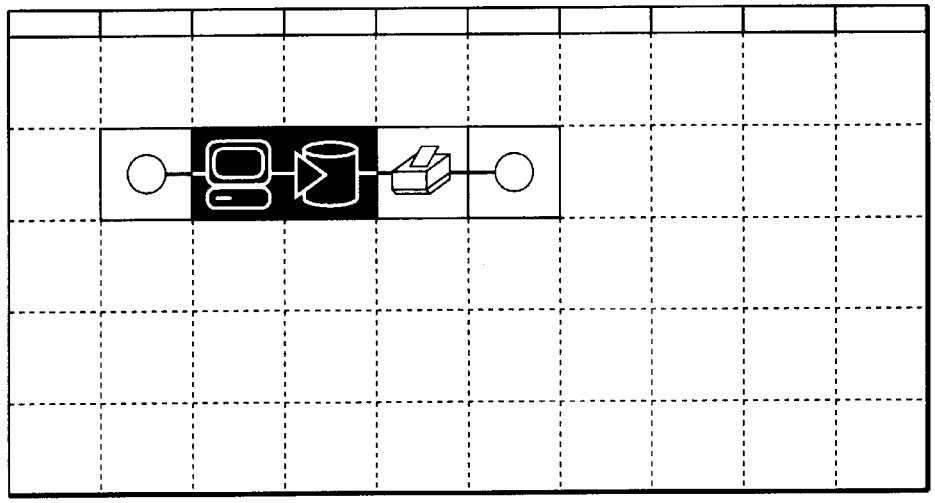

To define the record between modules, the user chooses adjacent module tiles. As shown in FIG. 9A, when "INPUT PROCESSING 1" and "UPDATE PROCESSING" have been selected, a data record definition screen 50 in subwindow form is displayed on the grid panel 30. The user enters the name of the data record in the name field on the screen and chooses a record item from a record item list, thereby defining the data record to be processed between the module tile INPUT PROCESSING 1 and the module tile UPDATE PROCESSING.

By repeating the process of defining a data record, the definition of data records inputted and outputted between module tiles is completed.

In the definition of data records, because the items in the output data record in a module at an earlier stage become the input data records in a module at a later stage, after a data record has been defined in an earlier module, the data record in each module in subsequent stages can be defined automatically.

The process of automatically defining a data record in module tiles will be explained in detail by reference to the flowchart for the input/output I/F automatic setting shown in FIG. 10.

First, information on module tiles to be used for a module tile component is acquired. In the case of the module tile component for the billing program arranged on the grid panel 30 of FIG. 8, if INPUT PROCESSING 1 data record has been defined, the following UPDATE PROCESSING data record is to be defined and the module management section 2c will retrieve module management information on it from the module management information file in the memory unit 5 (step S51). It is determined whether an input data record has been defined in the acquired module management information (step S52).

If no input data record has been defined at step S52, the contents of the definition of the input data record defined in the preceding module tile will be set automatically (step S58).

If an input data record has been defined, it is determined whether or not the input data record has the same contents of the definition as those of the definition of the output data record defined in the preceding module tile (step S53). If the contents of the definition of the input data record are not the same as those of the output data record defined in the preceding module tile, alarm information will be displayed (step S54), notifying the user that the contents of the definition of the input data record are wrong.

Next, control goes to step S55, where it is determined whether or not the output data record has been defined in the module management information about the relevant module UPDATE PROCESSING. If the output data record has not been defined, the contents of the definition of the output data record will be defined automatically according to the contents of the definition of the input data record (step S56).

If it has been determined at step S55 that the output data record has been defined, step S56 will be skipped and it will be determined whether the next module tile has been arranged (step S57). Because on the grid panel 30 of FIG. 7, PRINT PROCESSING tile is arranged as the next module tile, control returns to the process at step S51, where the process of setting the contents of the definition of each of the input data record and output data record in module tile PRINT PROCESSING is executed again.

In executing the processes at step S51 to step 58 repeatedly, the process of defining the input data record and output data record in each module tile constituting the application program has been executed repeatedly and the data records have been defined for all of the module tiles. This completes the input/output I/F automatic setting process.

The execution of the input/output I/F automatic setting process has completed the setting of the contents of the definition of the input and output data records in each module constituting the billing program arranged on the grid panel 30. Then, to define the processing of the data records in each module, a data record processing definition screen 60 in subwindow form as shown in FIG. 11 is displayed on the display unit 4.

Figure 11:
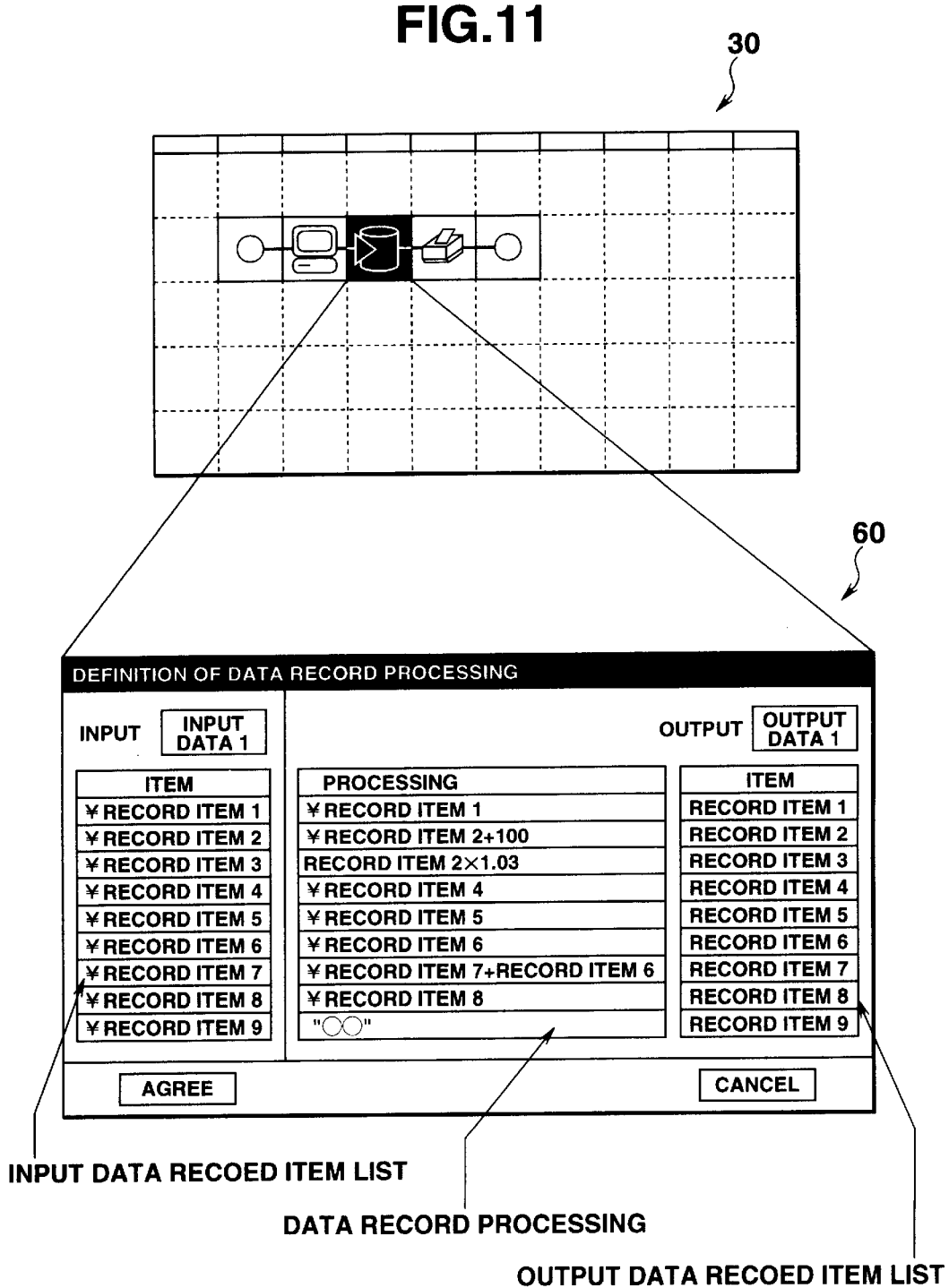
FIG. 11 shows a screen for giving a data record processing definition of module tile in the business application program creation process.

In the data record processing definition screen 60 of FIG. 11, the input data record items are listed in a processing definition frame of input data records and the output data record items are listed in a processing definition frame of output data records. The description of the processing of output data record items by reference to the input data record items can be written in the PROCESSING area.

The data record processing definition information on each module constituting the billing program arranged on the grid panel 30 by use of the data record processing definition screen 60 is stored by the module management information creation section 2e into the module management information file in the memory unit 5 in such a manner that the data record processing definition information is related to the billing program.

After the definition of record processing for each module has been completed this way, control proceeds to step S6 of FIG. 5, where the matching between records is checked. The reason why the input and output items are checked is that some input data record item or output data record item in each module may change when the record processing has been defined in a module at step S5.

Figure 10:
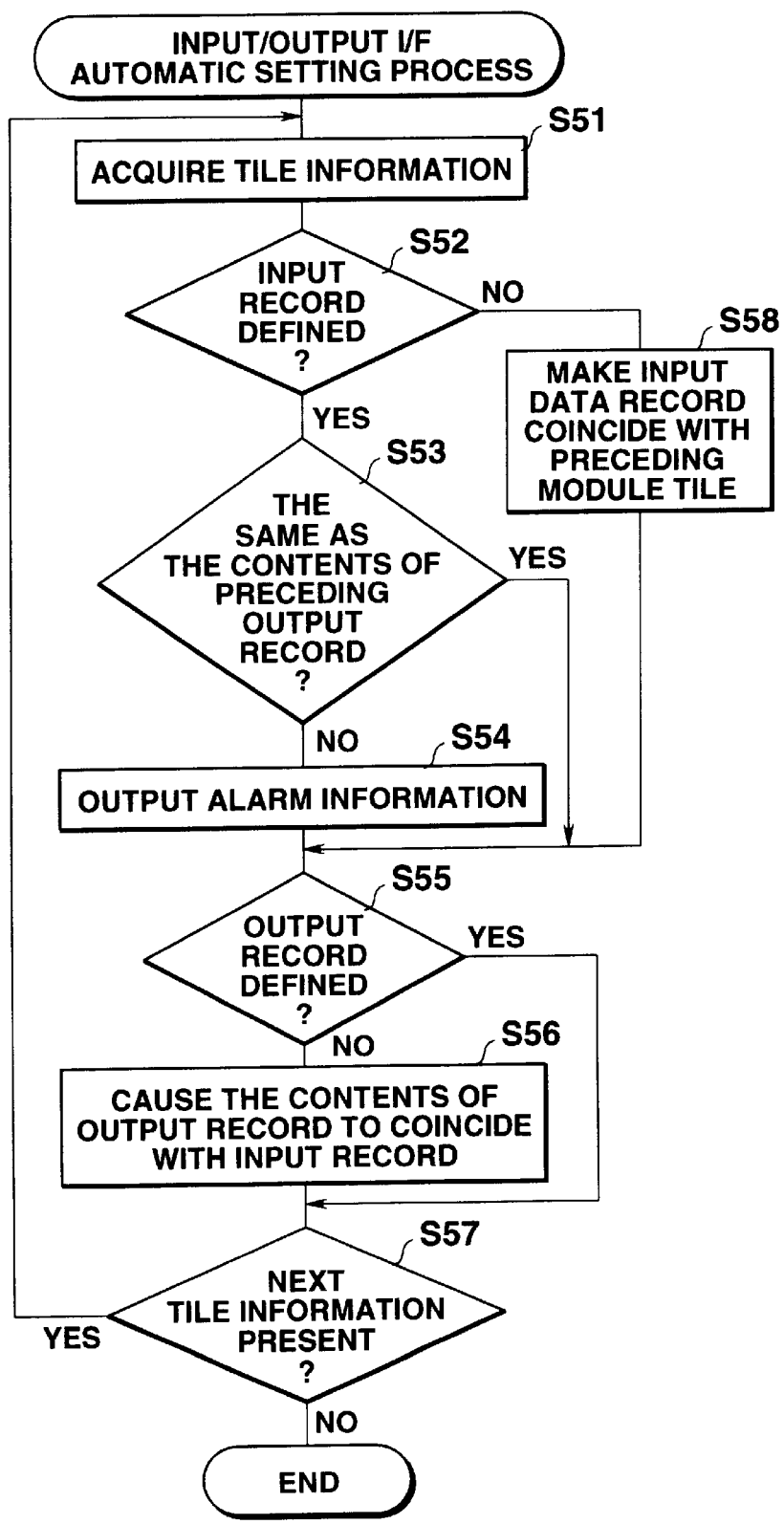
FIG. 10 is a flowchart for an input/output I/F automatic setting process executed at the application program construction section 2.

The matching between records is checked by executing the process whose flowchart is shown in FIG. 10.

Specifically, determinations at step S52 and step S53 show that a warning can be given when the data record transferred from one module does not coincide with that received by the following module. The warning lets the user know that correction is necessary.

By carrying out step S1 to step S6, a business application program can be constructed.

After the construction of the business application program or in the course of constructing the business application program, when a module tile arranged on the grid panel 30 is specified using the mouse cursor, various pieces of information on the module tile are displayed (step S7).

As for the user's operation to display each piece of information on the module tile, for example, when the user stops the mouse cursor over the relevant module tile for a specific time (about 500 ms), an information display window for the module tile is displayed in subwindow form.

Figure 12A:
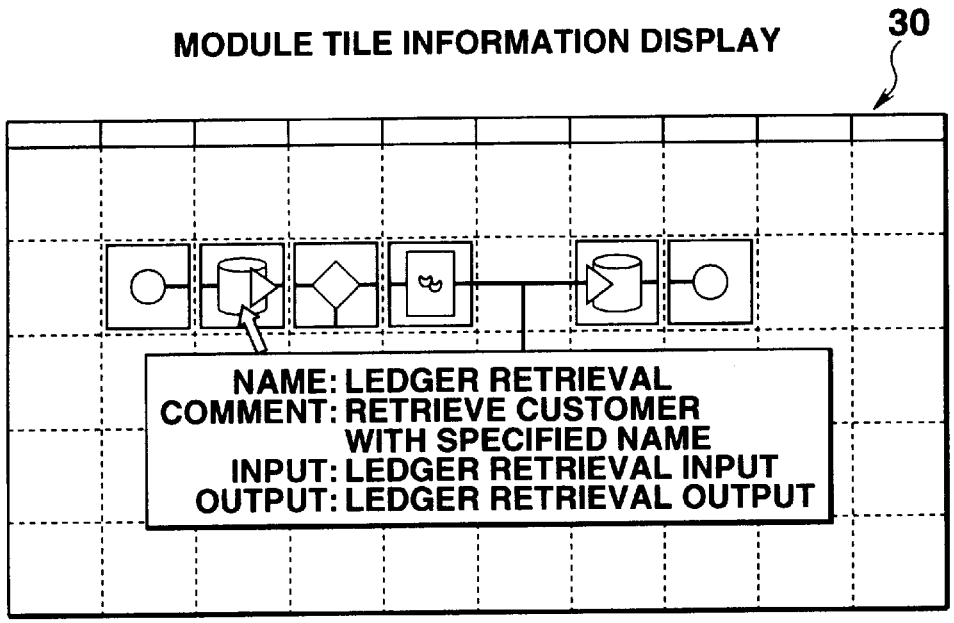
FIGS. 12A and 12B each show a state where various pieces of information on the constructed business application program.

For example, in a case where a module tile component as shown in FIG. 12A is arranged, when the user stops the mouse cursor over module tile RETRIEVAL PROCESSING for a predetermined time, the module management section 2c reads module management information for module tile RETRIEVAL PROCESSING from the module management information file 5b in the memory unit 5 and the information display window is displayed in subwindow form.

Figure 12B:
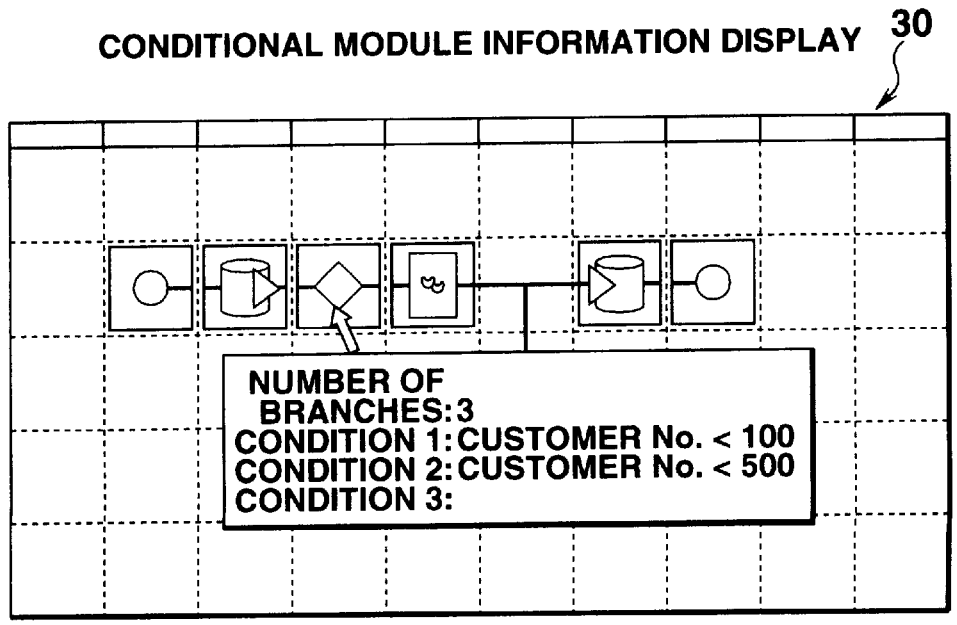

FIG. 12B illustrates that module management information for module tile CONDITIONAL BRANCH PROCESSING is displayed when the user stops the mouse cursor over module tile CONDITIONAL BRANCH PROCESSING for the predetermined time.

There may be a case where the processing must be branched on the basis of a conditional equation in constructing a business application program. A case where a business application program including the branching of processing on the basis of a conditional equation will be explained.

Figure 13:
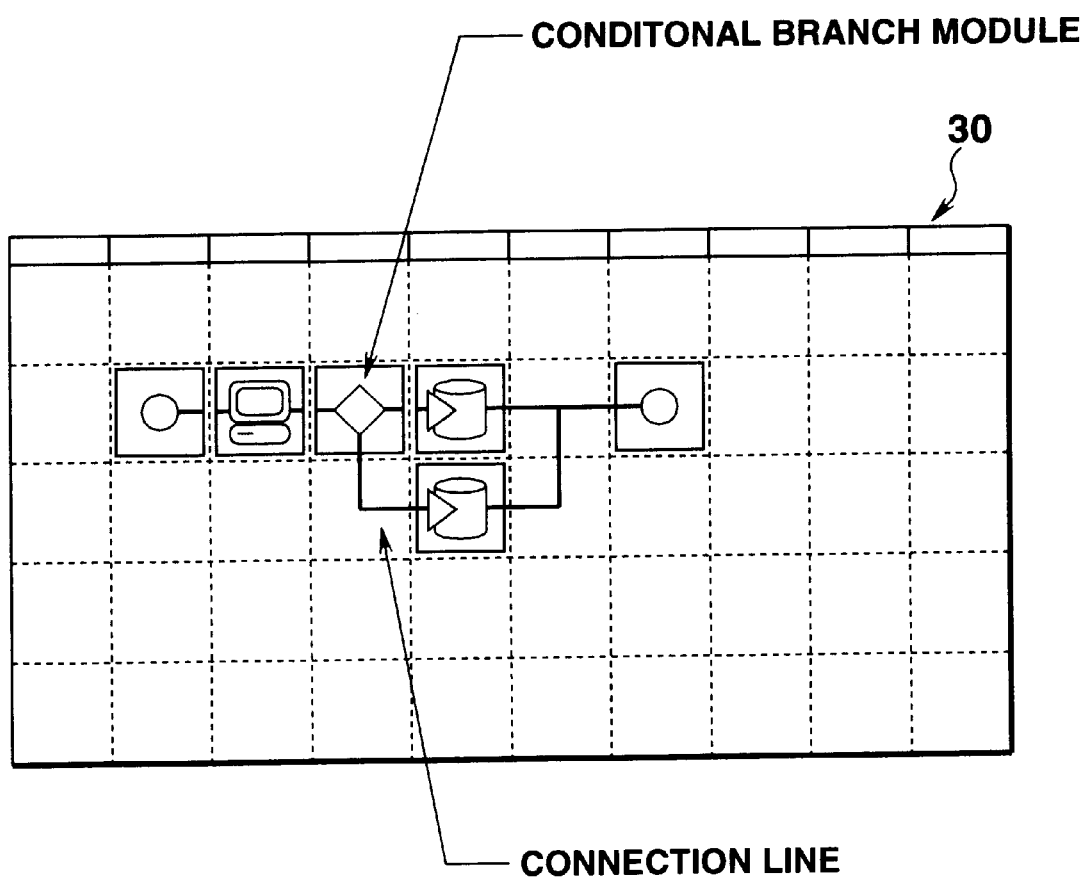
FIG. 13 shows an example of a conditional branch module inserting process executed by a business application program construction system to which the present invention has been applied.

FIG. 13 shows an example of a business application program including a conditional branch module. The process of inserting module tile CONDITIONAL BRANCH PROCESSING as shown in FIG. 13 will be explained by reference to FIGS. 14A–14F and 15.

If module tile CONDITIONAL BRANCH PROCESSING is inserted between module tile INPUT PROCESSING and module tile PROCESSING END as shown in FIG. 14A, a property sheet for setting a conditional equation for module tile CONDITIONAL BRANCH PROCESSING will be displayed on the display unit 4, as shown in FIG. 14B.

On the property sheet, the number of branches in conditional branching and the relevant conditional equation are set. In the property sheet shown in FIG. 14B, the number of branches is set at "2" and "CONDITIONAL EQUATION 1" and "CONDITIONAL EQUATION 2" are set as the conditional equations relevant to the number of branches. When the setting has been completed, two connection lines appear between module tile CONDITIONAL BRANCH PROCESSING and module tile PROCESSING END on the grid panel 30 as shown in FIG. 14C.

Of the output data records outputted from the module tiles set before the conditional branch module (that is, on the left side of the conditional branch module on the grid), the items of data records valid as far as the conditional branch module and global variables can be written in the equations.

Figure 14D:
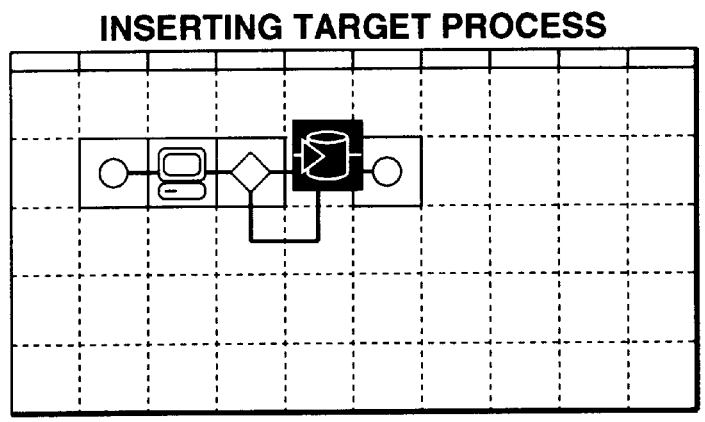
Figure 14E:
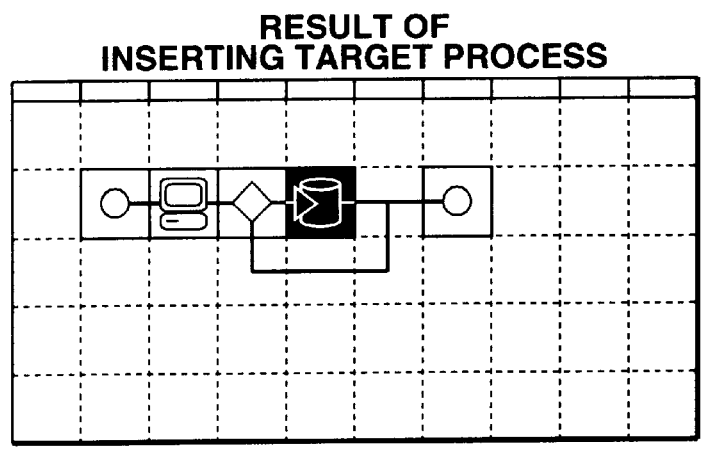
Figure 14F:
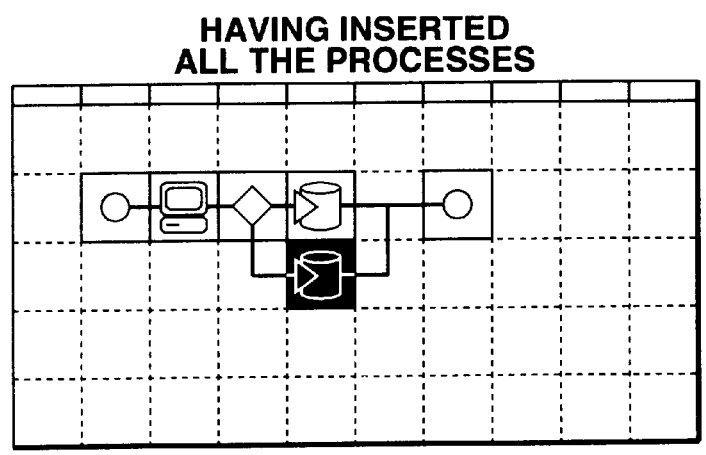

Thereafter, when module tile UPDATE PROCESSING 1 that performs a process after branching is inserted between module tile CONDITIONAL BRANCH PROCESSING and module tile PROCESSING END as shown in FIG. 14D, the representation of connection lines for branching is changed automatically. Then, module tile UPDATE PROCESSING 2 is inserted between module tile CONDITIONAL BRANCH PROCESSING and module tile PROCESSING END as shown in FIG. 14F, which completes the construction of the business application program.

In general, although business application programs are designed for different purposes, they have many common parts in the processing steps. Therefore, if consecutive program modules can be treated as a single program module like a subroutine, more labor saving can be achieved in constructing a business application program that has similar processing steps.

Figure 15:
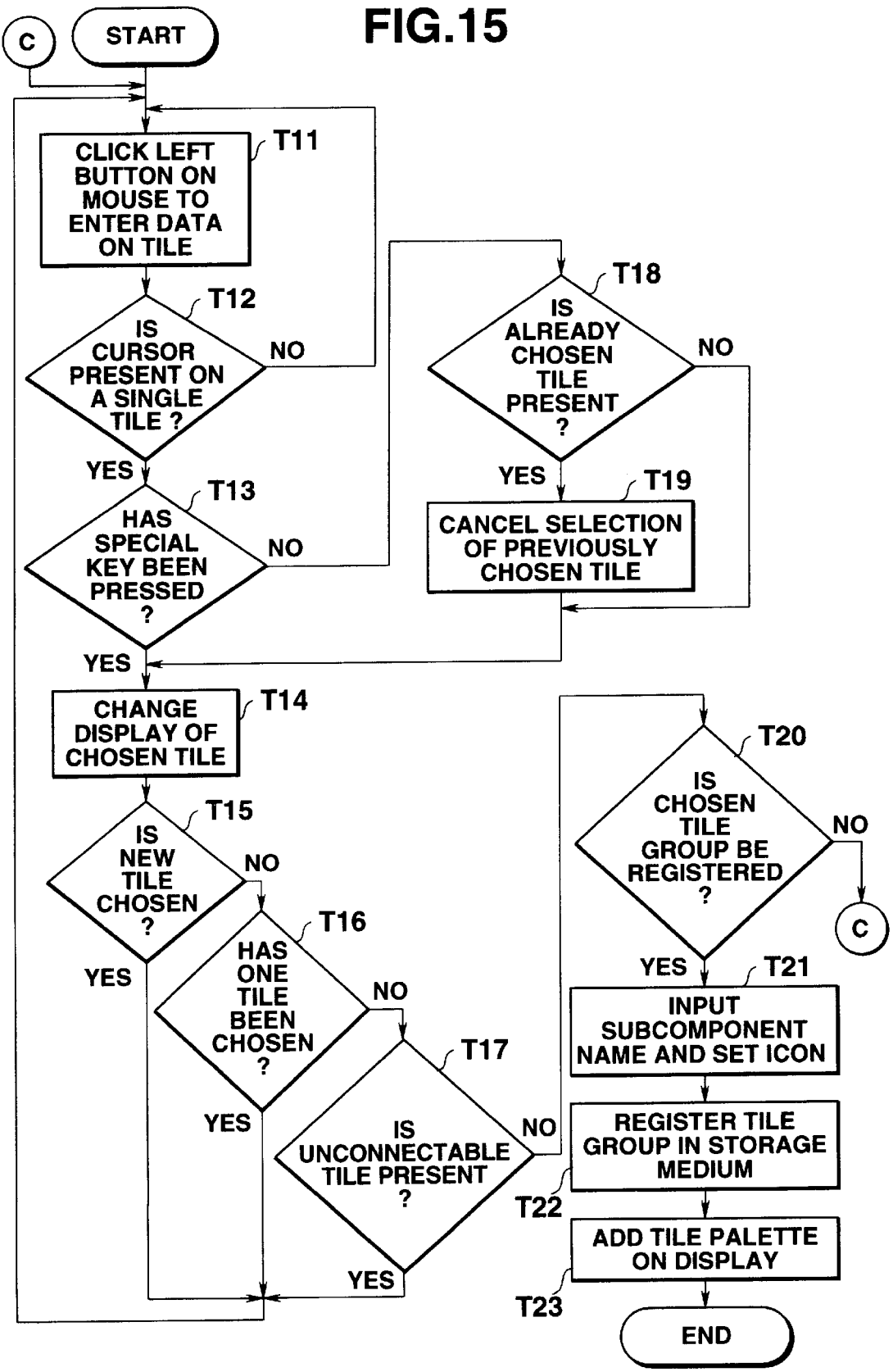
FIG. 15 is a flowchart for a subcomponent registration process executed by the business application program construction system.

The procedure for registration using module tiles as subcomponents will be explained by reference to a flowchart shown in FIG. 15.

First, at step T11, the user left-clicks a specific one of the module tiles displayed on the screen of the display unit 12, thereby specifying the specific module tile.

At step T12, it is determined whether or not the mouse cursor points clearly at the specific module tile, or whether or not the cursor is positioned away from the boundary between module tiles. If the cursor is positioned improperly and it cannot be determined which module tile has been specified, to prevent erroneous operations, the user will be considered to have entered no data and control will returned to the state before step T11, where another input will be waited for.

If at step T12, it is determined that the cursor is on the specific module tile, control will proceed to step T13, where it will be determined whether or not any special key, such as a shift key or a control key, has been pressed at the same time that clicking has been done. Specifically, if at step T11, the user has clicked the mouse button, while pressing a special key, control will go to step T14. If the user has entered the data without pressing any special key, control will move to step T18.

At step T18, it is determined whether or not there is any module tile that has been entered before the currently entered module tile and selected. If there is an already selected module tile, the selection of the already selected module tile will be canceled. After a newly specified module tile will have been selected, control will proceed to step T14. If there is no selected module tile, control will go to step T14 without doing anything.

Specifically, the operations executed at step T12 to step T14, step T18, and step T19 are the operation of selecting the specified module tile when the user clicks the mouse button to enter the data while pressing a special key and of causing the already selected module tile to return to the unselected state and selecting only a newly specified module tile when the user enters the data without pressing any special key.

At step T14, the method of displaying the selected module tile on the screen, for example, the way of using colors in display, is changed. This makes it easy to distinguish the selected module tile from the other module tiles.

At step T15, the user is requested to enter information as to whether to select another new module tile. If the user is going to select another module tile, control will return to step T11. If the selection of module tiles has been completed, control will go to step T16.

At step T16, it is determined whether or not only one module tile has been selected. If only one module tile has been selected, it will be determined that information on the module tile need not be registered again as a subcomponent because the information has been stored in the main storage medium 17 as module tile management information. Then, control will return to step T11.

If more than one module tile has been selected, control will proceed to step T17, where it will be determined whether or not the selected tiles can be executed consecutively. If discontinuous module tiles have been selected, control will return to step T11, where another input of module tiles will be waited for, because such module tiles cannot be used as subcomponents. If they can be processed continuously, control will move to step T20. Consequently, control will proceed to step T20 only when the condition for each of step T15 to step T17 is fulfilled.

At step T20, the user is requested to enter information as to whether to register the selected module tile group. If the user has entered information about no registration, control will return to step T11, where another input will be waited for. If the user has entered information about registration, control will proceed to step T21.

At step T21, the name of the subcomponent to be registered and the icon to be displayed on the subcomponent tile palette are inputted and stored in the auxiliary storage medium 19 (step T22). Furthermore, the representation of the newly registered subcomponent is added to the subcomponent tile palette on which the individual subcomponents are displayed (step T23), which completes the operation.

According to the above operation, the representation on the screen changes as shown in FIG. 16.

Figure 16A:
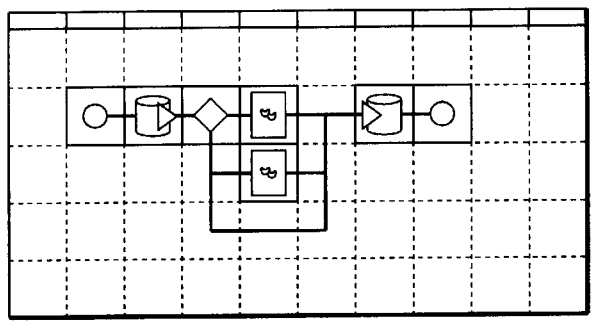
Figure 16B:
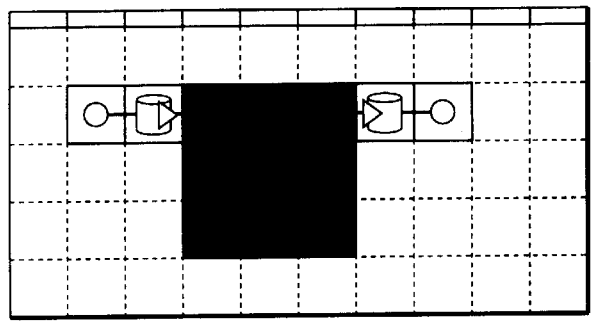
Figure 16C:
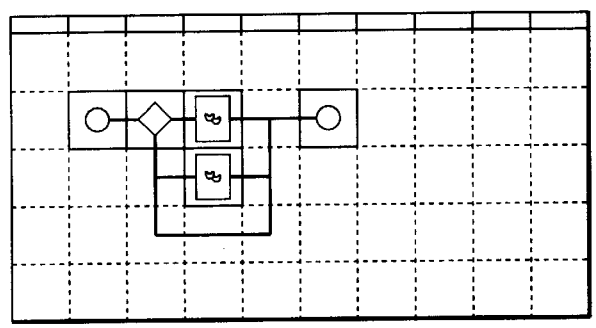

In the initial state shown in FIG. 16A, a group of module tiles to be registered is selected from the module tiles constituting a business application program. The selected module tiles are darkened as shown in FIG. 16B. Because the module tile group is treated as an independent series of processes once it has been registered as a subcomponent, a module tile indicating a start point and a module tile indicating an end point are added to the group as shown in FIG. 16C and the resulting group is registered. Information on the registered subcomponent is stored in the memory 5 (FIG. 1).

Figure 16D:
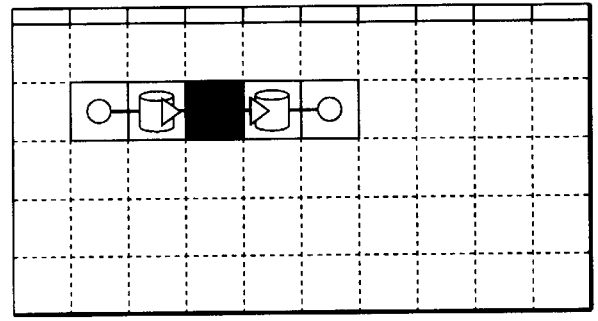
Figure 16E:
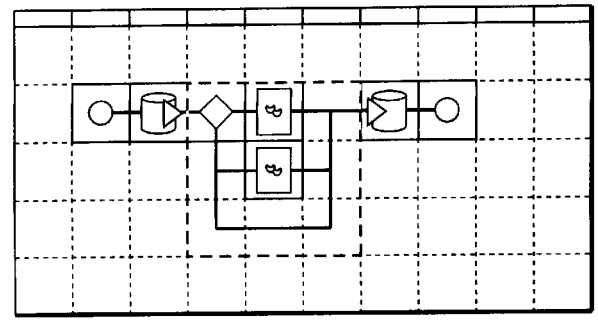

When the business application program of FIG. 16A is compressed after part of it has been registered as a subcomponent, the subcomponent portion is expressed as a single module tile as shown in FIG. 16D. All of the module tiles constituting the single subcomponent can be displayed by expanding the subcomponent as shown in FIG. 16E.

The expansion and compression of the subcomponent can be achieved in the subcomponent incorporated in the business application program. The data structure that enables the expansion and compression of such a subcomponent will be explained.

Figure 19:
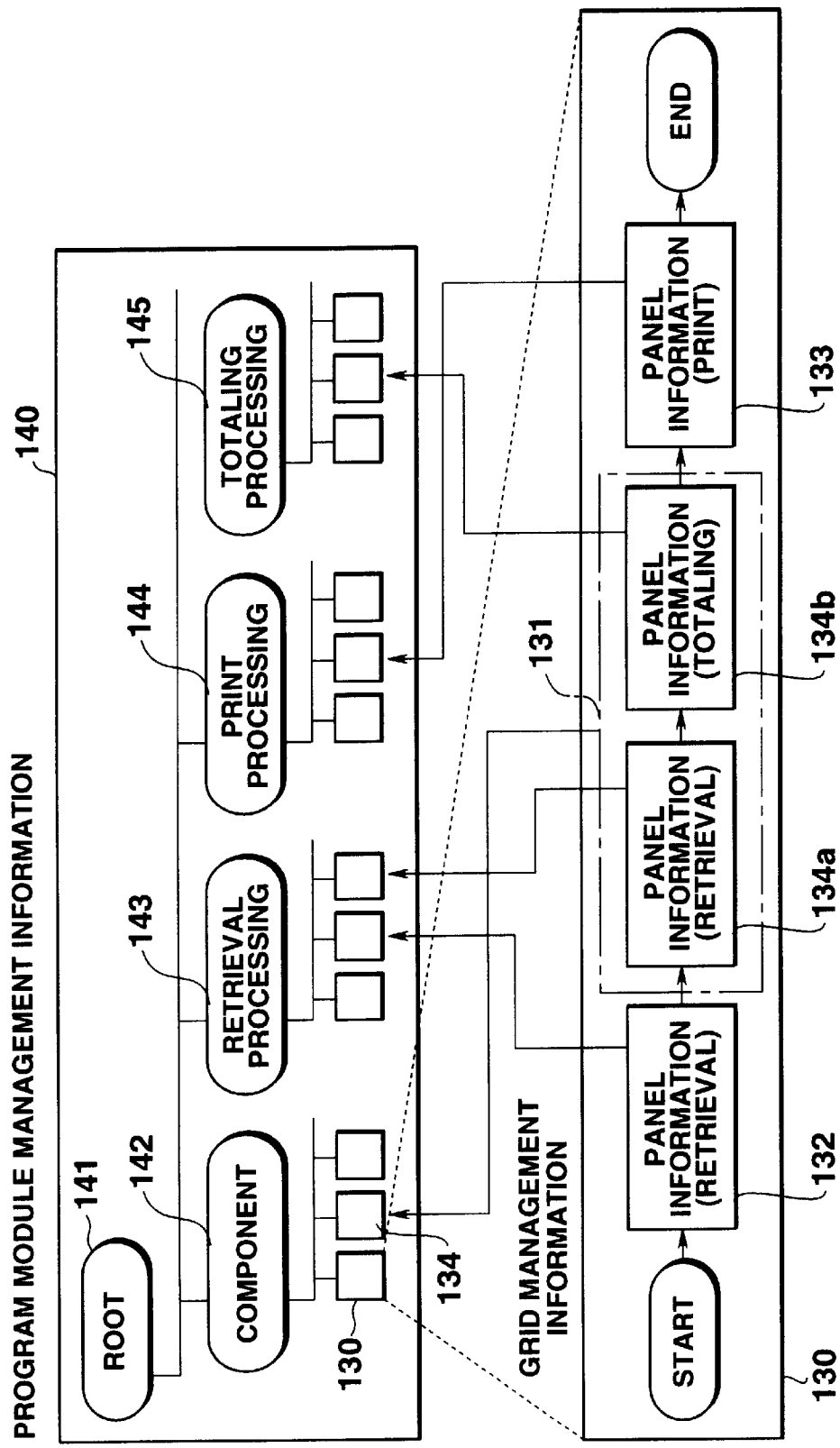
FIG. 19 shows the structure of data created in the business application program construction processing.

FIGS. 17 to 19 show the data structure of each of program module management information and grid management information stored in the memory 5 (FIG. 1).

In these figures, numeral 140 indicates program module management information. The program module management information 140 includes a component directory 142, a retrieval process directory 143, a print process directory 144, and a totaling process directory 145 under a root directory 141. Each of these directories stores detailed information.

Numeral 130 indicates grid management information on an application composed of a combination of module tiles. The grid management information 130 is stored in the component directory 142. Grid management information 134 on the subcomponent is also stored in the component directory 142.

FIG. 17 shows an example of the structure of the grid management information 130 stored in the program module management information 140. The grid management information 130 is information used to display on the screen a business application program that executes the retrieval process, subcomponent process, and print process consecutively.

Pieces of panel information 132, 133 constituting the grid management information 130 have pointers to the detailed information stored in the retrieval process directory 143 and print process directory 144, respectively. From the pieces of panel information 132, 133, the corresponding detailed information can be referred to.

Panel information 131 is information used to display a subcomponent and has a pointer to the grid management information 134 on the subcomponent stored in the component directory 142. From the panel information 131, the grid management information 134 can be referred to.

Specifically, as shown in FIG. 18, the grid management information 134 includes panel information 134*a* and panel information 134*b*. The panel information 134*a* has a pointer to the detained information in the retrieval process directory 143. The panel information 134*b* has a pointer to the detailed information in the totaling process directory 145.

In the state shown in FIG. 17, the subcomponent is displayed as a single module on the screen in the same manner as the other module tiles. As a result, use of the data structure prevents the display of a pointer allowing direct reference to the detailed information in the corresponding directory. To solve this problem, the subcomponent represented as a single tile is expanded to display panel information 134*a* and panel information 134*b* as shown in FIG. 19. This causes the pointers to the detailed information to be displayed, which enables the detailed information to be referred to.

Because the pointer from panel information 131 to grid management information 134 is managed continuously, the state of FIG. 17 can be restored easily.

The procedure for constructing a business application program using the subcomponents registered as described above will be explained by reference to FIGS. 20 and 21.

Figure 20:
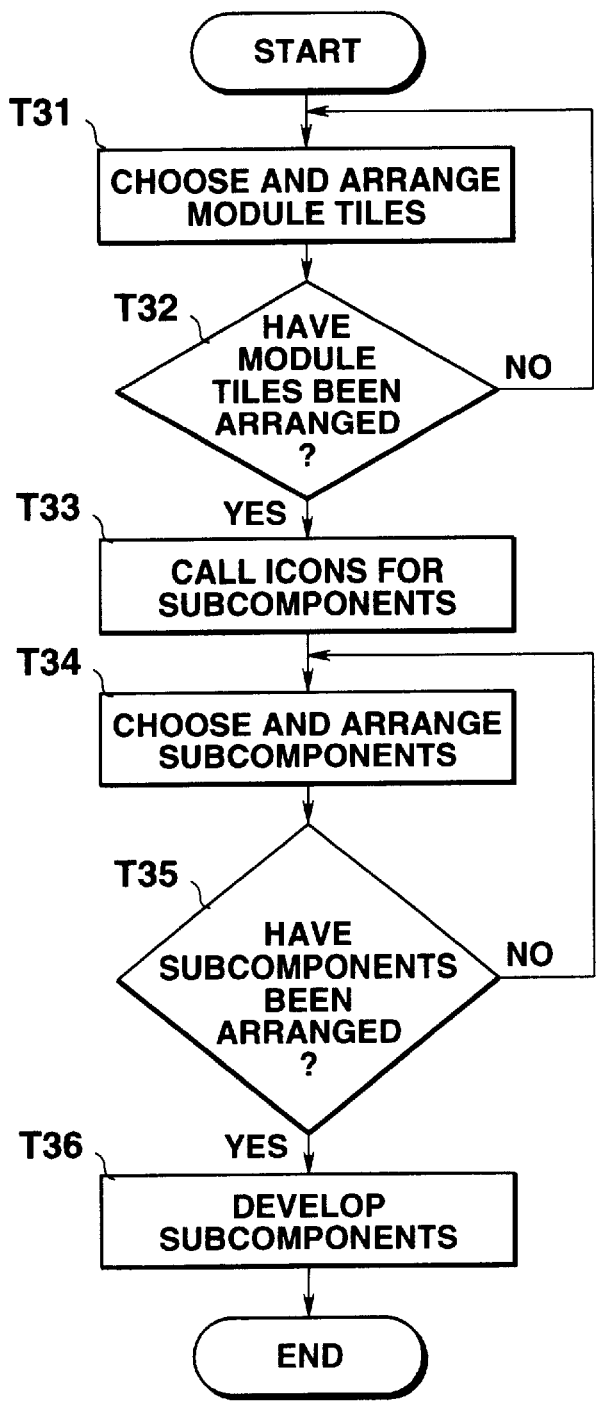
FIG. 20 is a flowchart for a subcomponent insertion process.

FIG. 20 is a flowchart of the procedure for constructing a business application program.

At step T31 in FIG. 20, a module tile is selected from the module tile palette on which the module tiles are arranged in order on the screen and is placed on the grid on the screen. Specifically, the cursor is moved to the desired module tile on the module tile palette. The tile is dragged to the desired cell on the grid, thereby placing the module tile in the desired position.

Each time one module tile has been positioned, control proceeds to step T32, where the user is required to enter information as to whether all the module tiles have been positioned. If the user is going to place another module tile, control will return to step T31. If the user has entered information about the completion of the arrangement, control will go to step T33.

At step T33, a tile for displaying subcomponents is called and displayed on the aforementioned tile palette. The called tile is selected and placed on the grid in the same procedure as the other module tiles displayed on the palette (step T34).

When the tile representing the subcomponent, together with the module tiles, is positioned in the cells on the grid, the user is requested to enter information as to whether the selection of all the subcomponents and the arrangement of tiles have been completed. If they have been completed, control will proceed to step T36. If the user continues to select subcomponents, control will return to step T34.

When control have reached step T36, each subcomponent is represented by a single tile. To execute the tiles after the construction of the business application program, each icon is expanded to display the module tiles constituting the subcomponents (step T36). Then, the process is completed.

FIG. 21 shows a representation on the screen after the operation at step T36 in FIG. 20 has been completed. The module tile palette is displayed to the left of the grid. At the bottom of the module tile palette, an icon representing a subcomponent is displayed.

On the grid, the module tile group constituting the business application program is displayed. In the portion enclosed by a bold line, the module tiles which are the expanded subcomponents or the component parts are displayed.

As described above, with the business application program construction system 1 according to the present embodiment, it is possible to construct a business application program using the registered subcomponents obtained by selecting from the module tiles.

Next, a function test or performance test of the business application program constructed with the help of the business application program construction tools will be explained.

The test execution section in the application program construction section 2 carries out environment settings, including the setting of various parameters, to test the business application program. Thereafter, when the user has given an instruction to execute a test from the input unit 3, the business application program stored in the hard disk 9 is tested for each program module. After all of the program modules in the relevant business application program have been tested, the individual module tiles are distinguished by using different colors on the display unit 4 on the basis of the processing time of each program module.

During the test, in the memory unit 5, an area in which tile display data is stored is created. As shown in FIG. 22A, the tile display data includes the location (coordinates) and color of each module tile determined by reference to the business application program to be tested. On the basis of the data in FIG. 22A, the following matters are set: which module tiles should be used to represent each program module, in which positions the module tiles should be placed, and what colors should be used to display the module tiles.

Furthermore, in the memory unit 5, an area in which the time required to test each program module is stored is created, as shown in FIG. 22B.

Next, the operation of the program test will be explained on the basis of the flowchart shown in FIG. 23.

Figure 23:
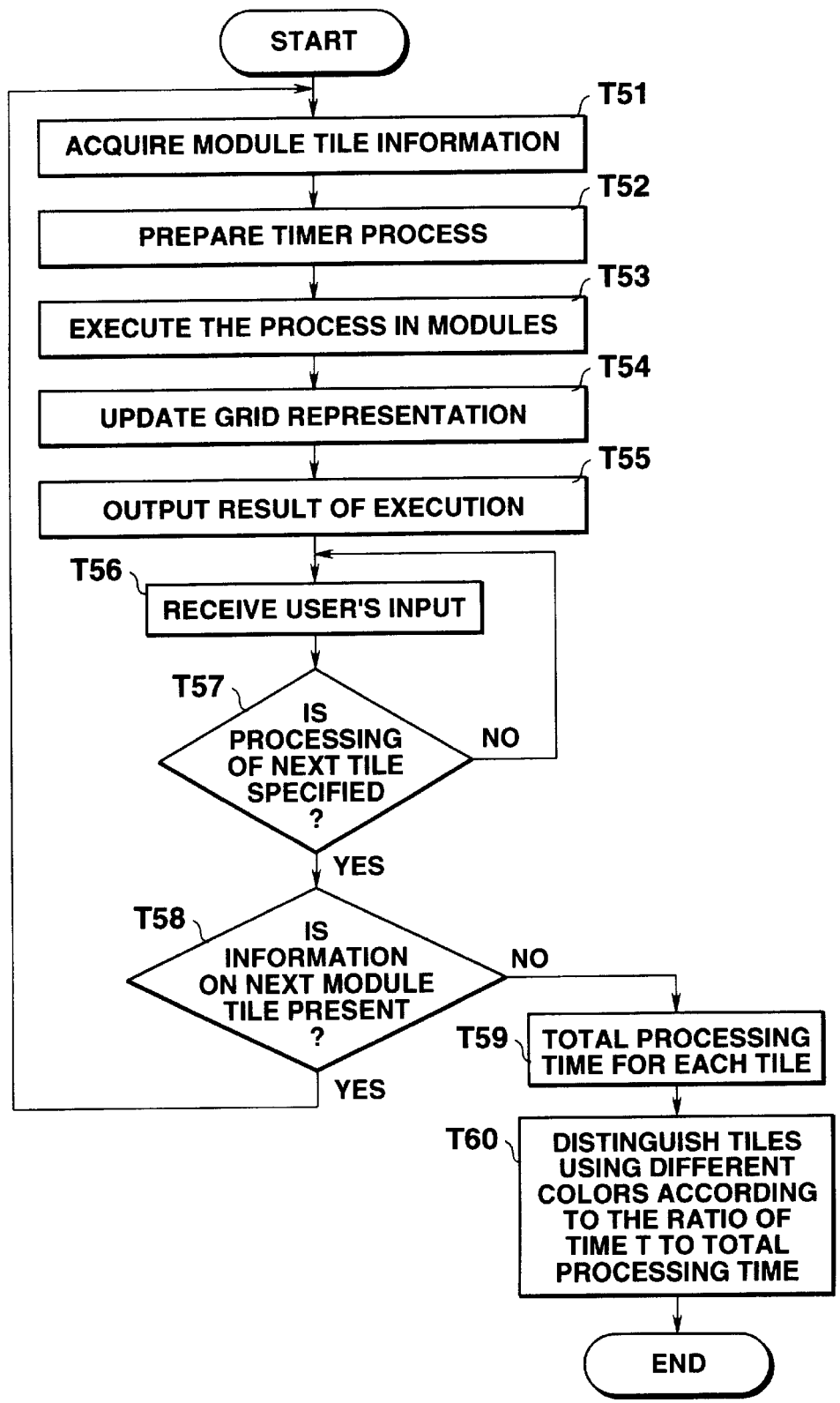
FIG. 23 is a flowchart for testing a business application program.

Before the test of the business application program shown in FIG. 23, the business application program to be tested that has been stored in the application specification file 9b in the hard disk 9 is divided into program modules which are basic processing units, a module tile corresponding to each program module is determined, and an execution time recording area for each module is created as shown in FIG. 22B. Then, grid tile information stored in the grid management information file 5a is read and displayed on the screen on the display unit 4.

When the test of the business application program is started, information on the module tile including information and data records about the first program module is acquired (step T51). Next, the clocking process for measuring the time required for the process of testing a module is prepared (step T52), the processing is performed in program modules, and the test is started (step T53).

When the processing is started at step T53, the coloring of the representation of the modules on the display unit 12 is updated as shown FIG. 24 (step T54).

Figure 24A:
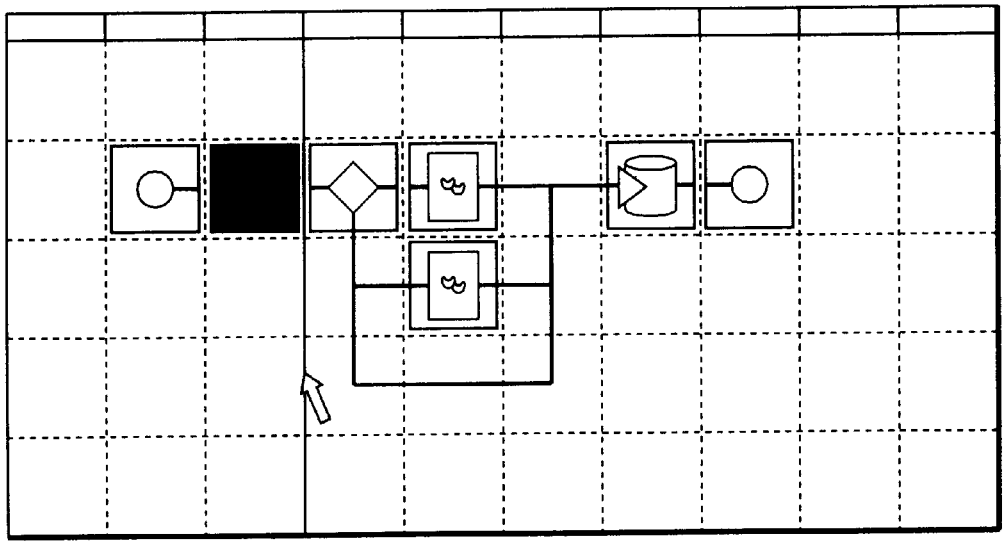
FIGS. 24A and 24B illustrate examples of screens displayed during the test.

FIG. 24A shows a state where the first module tile is being tested.

After the processing of one module tile has been completed, the result of the execution is outputted at step T55 and the display unit 4 displays whether or not an abnormal process has been carried out. At the same time, the time required for the processing is outputted. For example, if the time required to process program module No. 1, the first program module, is t1, program module No. 1 together with t1 will be displayed and further stored in the memory unit 5 as shown in FIG. 22B.

Thereafter, control proceeds to step T56, where the user is waited for to enter some data.

At step T56, the user input is accepted and it is determined whether or not the contents of the input specifies the processing of the next module tile (step T57). To specify the processing of the next module tile, the user enters the next module tile using, for example, a pointing device.

At step T57, if the user has not specified the processing of the next module tile, control will return to step T55, where the user is waited for to specify the process.

If at step T57, the processing of the next module tile is specified, control will proceed to step T58, where module tile information on the next module tile is read. Then, control will return to step T51 and the processes from step T51 to step T57 will be repeated.

If at step T58, the next module tile information cannot be read, it will be determined that the process of testing all the module tiles has been completed and control will proceed to step T59. At this time, the representation on the display unit 4 is, for example, as shown in FIG. 24B.

Figure 24B:
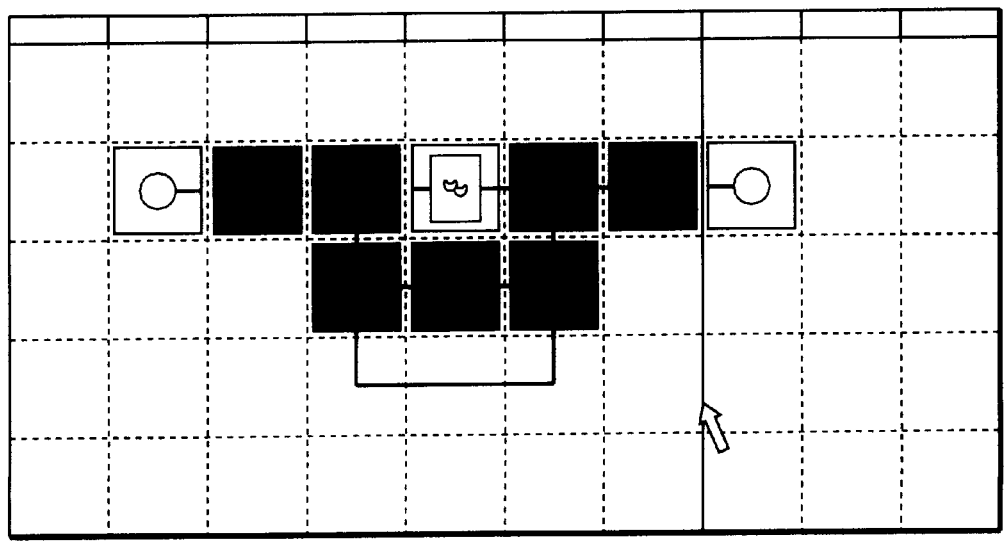

In FIG. 24B, there is a module tile (not darkened) showing an unprocessed state. The reason is that it is on the path that has not been selected at the branch section in a business application program involving a branching process. Specifically, in a business application program including a branching process, by entering the desired path from, for example, a pointing device, such as a mouse, the user can test the desired path.

Figure 25:
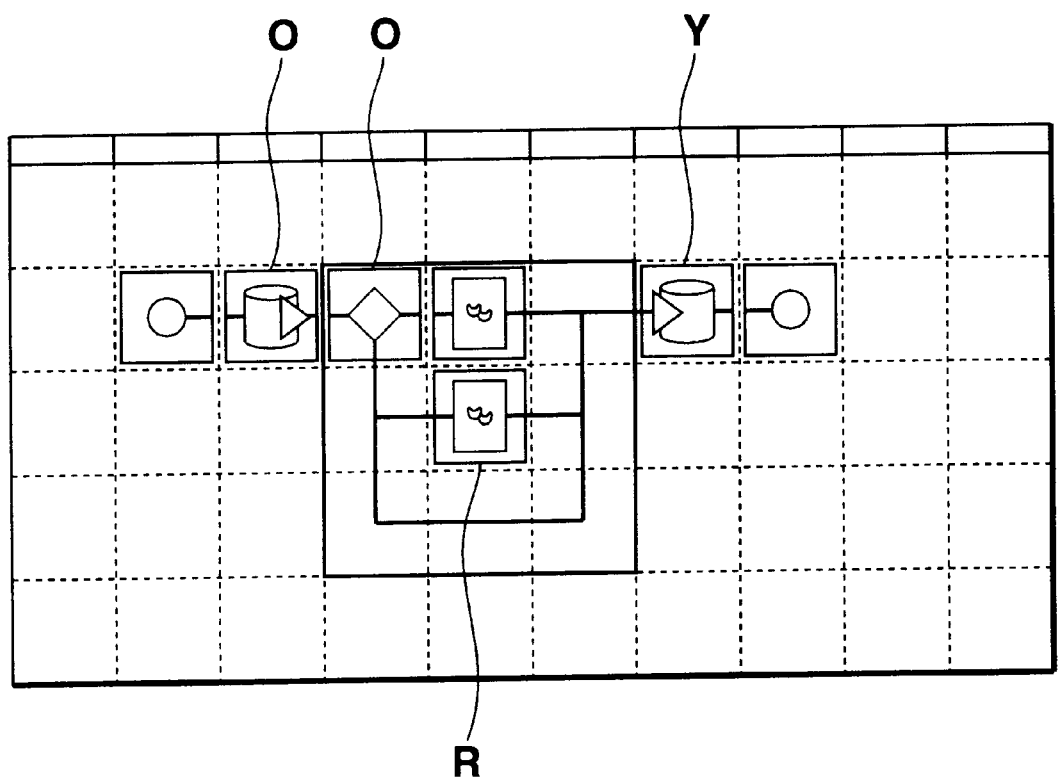
FIG. 25 illustrates an example of a screen displayed after the completion of the test.

At step T59, the times t1 to tn required to process the individual module tiles are totaled (step T59), and the ratio of the time required to process each module tile to the totaled time is calculated. On the basis of the result of the calculation, the color of each module panel is determined and color data is entered into each piece of tile information in FIG. 22A. As a result, the module tiles are distinguished by using different colors on the basis of the color information (step T60) and displayed as shown in FIG. 25, which completes the test of the business application program. In the program test, a program module that has occupied a larger proportion of the total of all the processing times of the entire business application program tested is colored redder.

FIG. 25 shows an example of a representation on the screen on the display unit 12 at the time when the test of the business application program has been completed. The module tile indicated by symbol R is colored read, that indicated by symbol O is colored orange, and that indicated by symbol Y is colored yellow. These colors enable the user to sensuously grasp which module a heavier load is applied to in the entire program processing.

According to the present invention, since module tiles obtained by modularizing and visualizing basic processes are located on a specific grid and the connection between the module tiles are set to enable the construction of a business application program, it is possible to grasp the flow of data from the beginning to end of the business application program with the passage of time.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A program construction assisting apparatus, comprising:

visualizing means for storing a plurality of program modules for processing various data processes and module tile information used for displaying each of the program modules as module tiles, the program modules and the module tile information corresponding with each other;

arrangement limiting means for arranging, on a display screen, a grid which limits an arrangement position of each of the visualized module tiles;

program presenting means for arranging a plurality of module tiles which correspond to a flow of a data processing program from a beginning to an end, next to one another in grid positions on the display screen, and presenting the data processing program with the plurality of module tiles visualized and displayed based on the module tile information;

determining means for, when the data processing program is presented by the program presenting means on the display screen and a user provides an instruction for arranging a new module tile, determining, based on an instructed arrangement position of the new module tile and the arrangement of the plurality of module tiles arranged on the grid, whether or not the instructed arrangement position is an effective position to insert the new module tile with respect to the flow;

inserting means for, when the instructed arrangement position is determined by the determining means as the effective position to insert the new module tile, inserting the new module tile into the instructed arrangement position, and rearranging the plurality of module tiles in accordance with grid intervals based on the instructed arrangement position, so as to cause the program constituted after the rearrangement; and program constructing means, based on the arrangement positions of the plurality of module tiles, for combining a plurality of program modules which correspond to the plurality of module tiles for the flow of the data processing program presented by the program presenting means, determining a data flow between the program modules, and thereby constructing a data processing program.

2. The program construction assisting apparatus according to claim 1, wherein:

when the module tile that is instructed by the user to be arranged is a module tile representing a branching process, the inserting means displays a connection line which meets a branching condition included in the instruction, with reference to positions of the grid intervals; and the program constructing means constructs the data processing program which includes the branching process, based on arrangement positions of the module tiles and the connection line.

3. A program construction assisting apparatus, comprising:

visualizing means for storing a plurality of program modules for processing various data processes and module tile information used for displaying each of the program modules as module tiles, the program modules and the module tile information corresponding with each other;

arrangement limiting means for arranging, on a display screen, a grid which limits an arrangement position of each of the visualized module tiles;

program presenting means for arranging a plurality of module tiles which correspond to a flow of a data processing program from a beginning to an end, next to one another in grid positions on the display screen, and presenting the data processing program with the plurality of module tiles visualized and displayed based on the module tile information;

selecting means for, when the data processing program is presented by the program presenting means on the display screen and a user selects a pair of adjacent module tiles, displaying a definition screen for defining input and module tiles;

setting means for setting data items and data formats of the input and output data transmitted between the pair of adjacent module tiles in accordance with information input by the user on the definition screen; and program constructing means, based on arrangement positions of the plurality of module tiles corresponding to a flow of a data processing program presented by the program presenting means and also based on the data items and data formats set by the setting means, for determining a flow of data between the program modules corresponding to the plurality of module tiles and data to be processed, and constructing a new data processing program.

4. The apparatus according to claim 3, wherein said setting means sets data items and data formats of input and output data transmitted between module tiles other than the module tiles selected by the selecting means in accordance with the data items and data formats of the input and output data which are set by the setting means.

5. A program construction assisting apparatus, comprising:

visualizing means for storing a plurality of program modules for processing various data processes and module tile information used for displaying each of the program modules as module tiles, the program modules and the modules tile information corresponding with each other;

arrangement limiting means for arranging, on a display screen, a grid which limits an arrangement position of each of the visualized module tiles;

program presenting means for arranging a plurality of module tiles which correspond to a flow of a data processing program from a beginning to an end, next to one another in grid positions on the display screen, and presenting the data processing program with the plurality of module tiles visualized and displayed based on the module tile information;

determining means for, when the data processing program is presented by the program presenting means on the display screen and a user selects a plurality of module tiles, determining whether or not the selected module tiles are sequentially executable based on whether or not the selected module tiles are arranged adjacent to one another;

modularizing means for, when the selected module tiles are determined by the determining means as being sequentially executable, storing information on the data processing program presented by the selected module tiles and the module tile information used for visualizing and displaying the data processing program as the module tiles, the information on the data processing program and the module tile information corresponding with each other; and program constructing means, when the module tiles corresponding to a data processing program are displayed on the display screen by the program presenting means, for constructing the data processing program by expanding the data processes represented by the displayed module tiles.

6. A program construction assisting apparatus, comprising:

program storing means for storing program module information on a plurality of program modules that are used for executing a data processing program and data flow information on a data flow between the program modules;

testing means for timing a period of time during which a test is executed on each of the program modules stored in the program storing means at each time of executing the test;

test time storing means for storing the period of time timed by the testing means and the program modules, the period of time and the program modules corresponding with each other; and program displaying means for arranging each of the program modules stored in the program storing means, on a display screen based on the data flow information, and displaying the program modules by distinguishing the program modules in accordance with the period of time stored in the test time storing means.

7. An article of manufacture comprising a computer usable medium having computer readable program code means embodied therein, the computer readable program code means in said article of manufacture comprising:

computer readable program code means for causing a computer to store a plurality of program modules for processing various data processes and module tile information used for displaying each of the program modules as module tiles, the program modules and the module tile information corresponding with each other;

computer readable program code means for causing a computer to arrange, on a display screen, a grid which limits an arrangement position of each of the visualized module tiles;

computer readable program code means for causing a computer to arrange a plurality of module tiles which correspond to a flow of a data processing program from a beginning to an end, next to one another in grid positions on the display screen, and presenting the data processing program with the plurality of module tiles visualized and displayed based on the module tile information;

computer readable program code means for causing a computer to, when the data processing program is presented on the display screen and a user provides an instruction for arranging a new module tile, determine, based on an instructed arrangement position of the new module tile and the arrangement of the plurality of module tiles arranged on the grid, whether or not the instructed arrangement position is an effective position to insert the new module tile with respect to the flow;

computer readable program code means for causing a computer to, when the instructed arrangement position is determined as the effective position to insert the new module tile, insert the new module tile into the instructed arrangement position, and rearranging the plurality of module tiles in accordance with grid intervals based on the instructed arrangement position, so as to cause the program constituted after the rearrangement; and computer readable program code means for causing a computer to, based on the arrangement positions of the plurality of module tiles, combine a plurality of program modules which correspond to the plurality of module tiles for the flow of the data processing program, determining a data flow between the program modules, and thereby constructing a data processing program.

8. An article of manufacture comprising a computer usable medium having computer readable program code means embodied therein, the computer readable program code means in said article of manufacture comprising:

computer readable program code means for causing a computer to store a plurality of program modules for processing various data processes and module tile information used for displaying each of the program modules as module tiles, the program modules and the module tile information corresponding with each other;

computer readable program code means for causing a computer to arrange, on a display screen, a grid which limits an arrangement position of each of the visualized module tiles;

computer readable program code means for causing a computer to arrange, a plurality of module tiles which correspond to a flow of a data processing program from a beginning to an end, next to one another in grid positions on the display screen, and to present the data processing program with the plurality of module tiles visualized and displayed based on the module tile information;

computer readable program code means for causing a computer to, when the data processing program is presented on the display screen and a user selects a pair of adjacent module tiles, display a definition screen for defining input and module tiles;

computer readable program code means for causing a computer to set data items and data formats of the input and output data transmitted between the pair of adjacent module tiles in accordance with information input by the user on the definition screen; and computer readable program code means for causing a computer to, based on arrangement positions of the plurality of module tiles corresponding to a flow of a data processing program presented and also based on the data items and data formats, determine a flow of data between the program modules corresponding to the plurality of module tiles and data to be processed, and to construct a new data processing program.

9. An article of manufacture comprising a computer usable medium having computer readable program code means embodied therein, the computer readable program code means in said article of manufacture, comprising:

computer readable program code means for causing a computer to store a plurality of program modules for processing various data processes and module tile information used for displaying each of the program modules as module tiles, the program modules and the modules tile information being corresponded with each other;

computer readable program code means for causing a computer to arrange, on a display screen, a grid which limits an arrangement position of each of the visualized module tiles;

computer readable program code means for causing a computer to arrange a plurality of module tiles which correspond to a flow of a data processing program from a beginning to an end, next to one another in grid positions on the display screen, and to present the data processing program with the plurality of module tiles visualized and displayed based on the module tile information;

computer readable program code means for causing a computer to, when the data processing program is presented on the display screen and a user selects a plurality of module tiles, determine whether or not the selected module tiles are sequentially executable based on whether or not the selected module tiles are arranged adjacent to one another;

computer readable program code means for causing a computer to, when the selected module tiles are determined as being sequentially executable, store information on the data processing program presented by the selected module tiles and the module tile information used for visualizing and displaying the data processing program as the module tiles, the information on the data processing program and the module tile information corresponding with each other; and computer readable program code means for causing a computer to, when the module tiles corresponding to a data processing program are displayed on the display screen, construct the data processing program by expanding the data processes represented by the displayed module tiles.

10. An article of manufacture comprising a computer usable medium having computer readable program code means embodied therein, the computer readable program code means in said article of manufacture, comprising:

computer readable program code means for causing a computer to store program module information on a plurality of program modules that are used for executing a data processing program and data flow information on a data flow between the program modules;

computer readable program code means for causing a computer to measure a period of time during which a test is executed on each of the program modules stored at each time of executing the test;

computer readable program code means for causing a computer to store the period of time measured and the program modules, the period of time and the program modules corresponding with each other; and computer readable program code means for causing a computer to arrange each of the program modules stored, on a display screen based on the data flow information, and displaying the program modules by distinguishing the program modules in accordance with the period of time stored.

* * * * *